United States Patent
Murakami et al.

(10) Patent No.: US 6,629,408 B1
(45) Date of Patent: Oct. 7, 2003

(54) EXHAUST EMISSION CONTROL SYSTEM FOR INTERNAL COMBUSTION ENGINE

(75) Inventors: Akira Murakami, Wako (JP); Mistuo Hashizume, Wako (JP); Kotaro Miyashita, Wako (JP); Toshikatsu Takanohashi, Wako (JP); Yuichiro Tanabe, Wako (JP); Akira Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 40 days.

(21) Appl. No.: 09/685,571

(22) Filed: Oct. 11, 2000

(30) Foreign Application Priority Data

Oct. 12, 1999 (JP) .......................... 11-289214
Nov. 16, 1999 (JP) .......................... 11-326128

(51) Int. Cl.⁷ ............................................. F01N 3/00
(52) U.S. Cl. ........................... 60/277; 60/285; 60/286; 60/301
(58) Field of Search ..................... 60/274, 277, 285, 60/286, 301

(56) References Cited

U.S. PATENT DOCUMENTS

| | | | | |
|---|---|---|---|---|
| 5,201,802 A | * | 4/1993 | Hirota et al. | 60/285 |
| 5,335,538 A | * | 8/1994 | Blischke et al. | 60/277 |
| 5,644,912 A | * | 7/1997 | Kawamura | 60/277 |
| 5,678,402 A | * | 10/1997 | Kitagawa et al. | 60/277 |
| 5,937,638 A | * | 8/1999 | Akazaki et al. | 60/277 |
| 5,987,883 A | * | 11/1999 | Schneider | 60/274 |
| 6,085,518 A | * | 7/2000 | Yamashita et al. | 60/274 |
| 6,116,021 A | * | 9/2000 | Schumacher et al. | 60/277 |
| 6,116,023 A | * | 9/2000 | Ishizuka et al. | 60/285 |
| 6,173,569 B1 | * | 1/2001 | Kusada et al. | 60/277 |
| 6,216,451 B1 | * | 4/2001 | Schnaibel et al. | 60/277 |

FOREIGN PATENT DOCUMENTS

| | | |
|---|---|---|
| EP | 0 735 250 A2 | 10/1996 |
| EP | 09112308 | 4/1997 |
| EP | 10299460 | 11/1998 |
| EP | 0 903 478 A2 | 3/1999 |
| JP | 6-159048 | * 6/1994 |
| JP | 10-299460 | 11/1998 |

OTHER PUBLICATIONS

European Search Report EP 00 12 2075; Date of completion Jan. 9, 2003.

* cited by examiner

*Primary Examiner*—Thomas E. Denion
(74) *Attorney, Agent, or Firm*—Arent Fox Kintner Plotkin & Kahn

(57) ABSTRACT

An exhaust emission control system for an internal combustion engine, having a nitrogen oxide removing device provided in an exhaust system of the internal combustion engine for absorbing nitrogen oxides contained in exhaust gases in an exhaust lean condition. The exhaust emission control system includes first and second oxygen concentration sensors respectively provided upstream and downstream of the nitrogen oxide removing device for detecting an oxygen concentration in the exhaust gases. The air-fuel ratio of an air-fuel mixture to be supplied to the engine is changed from a lean region to a rich region with respect to a stoichiometric ratio. An amount of reducing components flowing into the nitrogen oxide removing device from the time when an output value from the first oxygen concentration sensor has changed to a value indicative of a rich air-fuel ratio after enrichment of the air-fuel ratio is calculated. Deterioration of the nitrogen oxide removing device is determined according to the calculated amount of reducing components and an output value from the second oxygen concentration sensor.

5 Claims, 15 Drawing Sheets

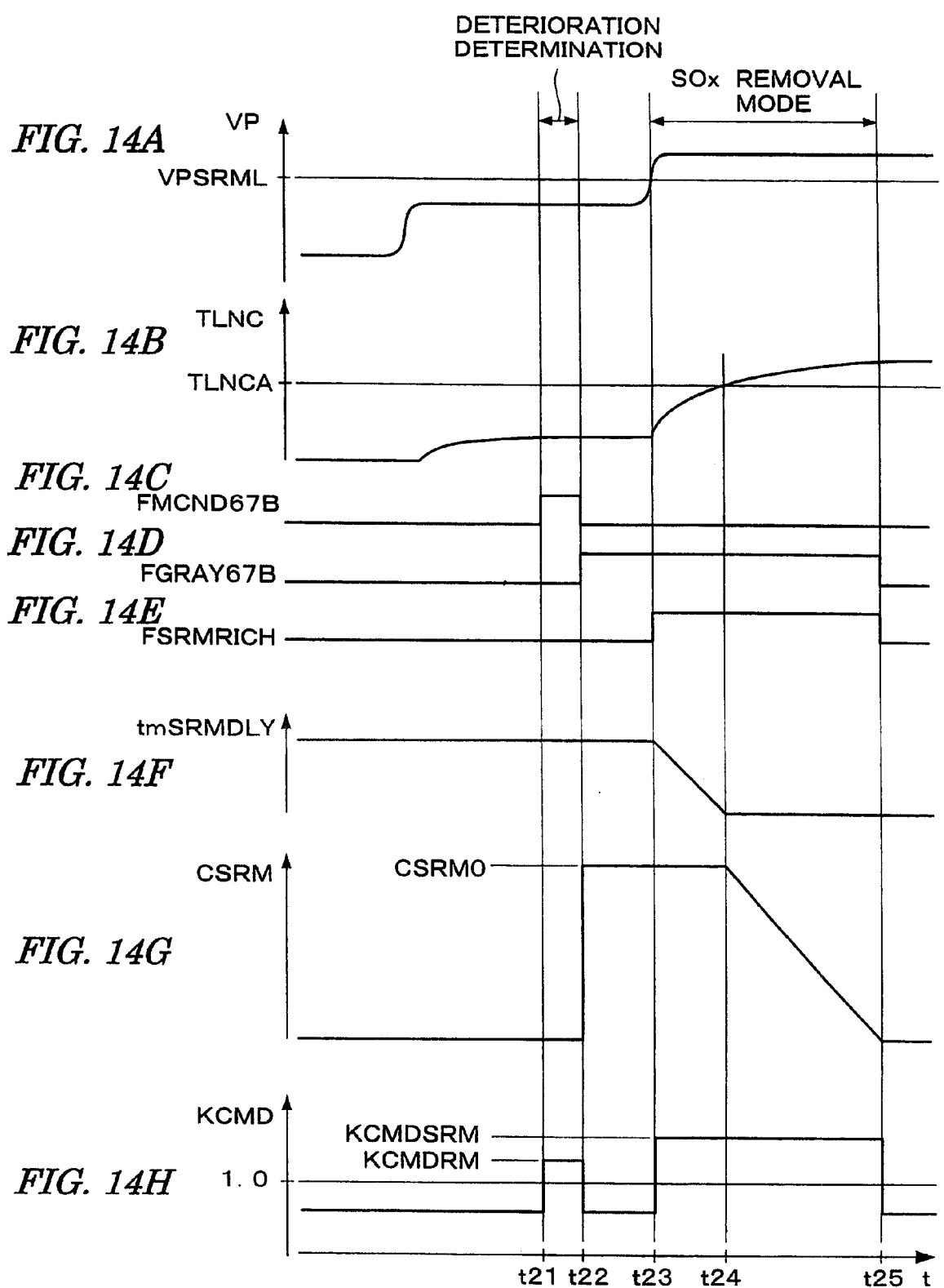

EXHAUST EMISSION CONTROL SYSTEM FOR INTERNAL COMBUSTION ENGINE

BACKGROUND OF THE INVENTION

The present invention relates to an exhaust emission control system for an internal combustion engine, and more particularly to an exhaust emission control system including a NOx removing device for removing NOx (nitrogen oxides) and having a function of determining deterioration of the NOx removing device.

When the air-fuel ratio of an air-fuel mixture supplied to an internal combustion engine is set in a lean region with respect to a stoichiometric ratio (i.e., in the case of carrying out a so-called lean operation), the emission amount of NOx tends to increase. To cope with this, a known technique for exhaust emission control includes providing a NOx removing device containing a NOx absorbent for absorbing NOx in the exhaust system of the engine. The NOx absorbent has a characteristic that when the air-fuel ratio is set in a lean region with respect to the stoichiometric ratio and the oxygen concentration in exhaust gases is therefore relatively high (the amount of NOx is large) (this condition will be hereinafter referred to as "exhaust lean condition"), the NOx absorbent absorbs NOx. When the air-fuel ratio is set in a rich region with respect to the stoichiometric ratio and the oxygen concentration in exhaust gases is therefore relatively low (this condition will be hereinafter referred to as "exhaust rich condition"), the NOx absorbent discharges the absorbed NOx. The NOx removing device containing this NOx absorbent is configured so that NOx discharged from the NOx absorbent in the exhaust rich condition is reduced by HC and CO and then exhausted as nitrogen gas, while HC and CO are oxidized by NOx and then exhausted as water vapor and carbon dioxide.

There is naturally a limit to the amount of NOx that can be absorbed by the NOx absorbent, and this limit tends to decrease with deterioration of the NOx absorbent. A technique of determining a degree of deterioration of the NOx absorbent is known in the art (Japanese Patent Laid-open No. Hei 10-299460). In this technique, two oxygen concentration sensors are arranged upstream and downstream of the NOx removing device, and air-fuel ratio enrichment for discharging the NOx absorbed by the NOx absorbent is carried out. Then, the degree of deterioration of the NOx absorbent is determined according to a delay time period from the time when an output value from the upstream oxygen concentration sensor has changed to a value indicative of a rich air-fuel ratio to the time when an output value from the downstream oxygen concentration sensor has changed to a value indicative of a rich air-fuel ratio.

However, the above delay time period changes with engine operating condition, (engine rotational speed and engine load), so that unless the engine operating condition for the execution of deterioration determination is limited to a narrow range, an improper determination is likely. Changing the deterioration determination threshold according to the engine operating condition is one method for solving this problem. However, improper determination is prone to occur in transient conditions where the engine operating condition changes.

Further, the NOx absorbing capacity of the NOx absorbent is reduced not only by the deterioration of the NOx absorbent, but also by absorption of sulfur oxides (SOx) contained in fuel components. This absorption is called sulfur poisoning. In the conventional deterioration determining technique, however, sulfur poisoning is not taken into consideration, Therefore, there is a possibility that it may be improperly determined that the NOx absorbent itself is deteriorated when the NOx absorbing capacity is reduced by sulfur poisoning. The NOx absorbing capacity reduced by sulfur poisoning can be recovered by regeneration processing. Accordingly, it is undesirable to determine that the NOx absorbent is in an unrecoverable deteriorated condition in the case of sulfur poisoning.

SUMMARY OF THE INVENTION

It is accordingly an object of the present invention to provide an exhaust emission control system which can perform accurate determination of deterioration of a NOx removing device regardless of an engine operating condition.

It is another object of the present invention to provide an exhaust emission control system which can accurately determine deterioration of a NOx removing device and has a function of reliably regenerating the NOx removing device in the case that it is regenerable.

In accordance with an aspect of the present invention, there is provided an exhaust emission control system for an exhaust system for an internal combustion engine, having a nitrogen oxide removing means for absorbing NOx contained in exhaust gases in an exhaust lean condition. This system further comprises the following: first and second oxygen concentration sensors respectively provided upstream and downstream of the nitrogen oxide removing means for detecting the oxygen concentration in the exhaust gases; deterioration-determination enriching means for changing the air-fuel ratio of an air-fuel mixture to be supplied to the engine from a lean region to a rich region with respect to a stoichiometric ratio; reducing-component amount calculating means for calculating an amount of reducing components flowing into the nitrogen oxide removing means from the time when an output value from the first oxygen concentration sensor has changed to a value indicative of a rich air-fuel ratio after the enrichment executed by the deterioration determination enriching means; and deterioration determining means for determining deterioration of the nitrogen oxide removing means according to the amount of reducing components calculated by the reducing-component amount calculating means and an output value from the second oxygen concentration sensor.

With this arrangement, after changing the air-fuel ratio of an air-fuel mixture to be supplied to the engine from a lean region to a rich region with respect to the stoichiometric ratio, an amount of reducing components flowing into the nitrogen oxide removing means is calculated from the time when the output value from the first oxygen concentration sensor has changed to a value indicative of a rich air-fuel ratio, and the deterioration of the nitrogen oxide removing means is determined according to the calculated amount of reducing components and the output value from the second oxygen concentration sensor. Accordingly, the deterioration determination can be performed according to the amount of reducing components changing with an engine operating condition to thereby make it possible to perform accurate determination of deterioration of the nitrogen oxide removing means in a wide range of engine operating conditions.

Preferably, the deterioration determining means determines that the nitrogen oxide removing means is deteriorated when the output value from the second oxygen concentration sensor has changed to a value indicative of a rich air-fuel ratio before the amount of reducing components reaches a predetermined amount.

As a modification, the deterioration determining means determines that the nitrogen oxide removing means is deteriorated when the amount of reducing components at the time the output value from the second oxygen concentration sensor has changed to a value indicative of a rich air-fuel ratio is smaller than a predetermined amount.

As another modification, the deterioration determining means determines that the nitrogen oxide removing means is deteriorated when the output value from the second oxygen concentration sensor indicates a rich air-fuel ratio at the time the amount of reducing components has reached a predetermined amount.

Preferably, the reducing-component amount calculating means calculates the amount of reducing components by integrating an amount of exhaust gases flowing into the nitrogen oxide removing means.

With this configuration, the amount of reducing components is calculated by integrating the amount of exhaust gases flowing into the nitrogen oxide removing means, so that the calculation of the reducing component amount can be easily made by using a parameter indicative of the amount of exhaust gases.

Preferably, the exhaust emission control system further includes reduction enriching means for intermittently enriching the air-fuel ratio to reduce NOx absorbed by the nitrogen oxide removing means. In this system, the deterioration-determination enriching means executes enrichment of the air-fuel ratio with a degree of enrichment smaller than a degree of enrichment executed by the reduction enriching means over a time period longer than a time period of enrichment executed by the reduction enriching means.

Preferably, the reducing-component amount calculating means uses a basic fuel amount as a parameter indicative of the amount of exhaust gases flowing into the nitrogen oxide removing means, the basic fuel amount being set according to a rotational speed of the engine and an intake air pressure of the engine so that the air-fuel ratio becomes a substantially constant value.

Preferably, the first and second oxygen concentration sensors have characteristics that the output values therefrom rapidly change in the vicinity of the stoichiometric ratio.

Preferably, the deterioration determining means makes the determination whether the nitrogen oxide removing means is normal or deteriorated, or makes the decision of withholding the determination, according to the amount of reducing components calculated by the reducing-component amount calculating means and the output value from the second oxygen concentration sensor, and the control system further includes alarming means for giving an alarm when the determination that the nitrogen oxide removing means is deteriorated has been made by the deterioration determining means; and deterioration regenerating means for executing regeneration processing for the nitrogen oxide removing means when the decision of withholding the determination has been made by the deterioration determining means.

With this arrangement, the determination whether the nitrogen oxide removing means is normal or deteriorated, or the decision of withholding this determination is made according to the amount of reducing components calculated by the reducing-component amount calculating means and the output value from the second oxygen concentration sensor. When it is determined that the nitrogen oxide removing means is deteriorated, an alarm is given to a driver, whereas when the decision of withholding the determination is made, the regeneration processing for the nitrogen oxide removing means is executed. Accordingly, the driver can immediately take certain measures when the nitrogen oxide removing means is determined to be apparently deteriorated, and as in the case that the absorbing capacity of the NOx absorbent is reduced by sulfur poisoning, the withholding of the determination is decided to allow reliable regeneration of the NOx removing device.

More preferably, the deterioration determining means determines that the nitrogen oxide removing means is deteriorated when the amount of reducing components is smaller than an NG determination threshold, determines that the nitrogen oxide removing means is normal when the amount of reducing components is greater than or equal to an OK determination threshold larger than the NG determination threshold, or decides to withhold the determination when the amount of reducing components is in the range between the NG determination threshold and the OK determination threshold, at the time the output value from the downstream oxygen concentration sensor has changed to a value indicative of a rich air-fuel ratio.

As a modification, the deterioration determining means determines that the nitrogen oxide removing means is deteriorated when the output value from the downstream oxygen concentration sensor indicates a rich air-fuel ratio at the time the amount of reducing components has become greater than or equal to an NG determination threshold, determines that the nitrogen oxide removing means is normal when the output value from the downstream oxygen concentration sensor indicates a lean airfuel ratio at the time the amount of reducing components has become greater than or equal to an OK determination threshold larger than the NG determination threshold, or decides to withhold the determination when the output value from the downstream oxygen concentration sensor indicates a rich air-fuel ratio at the time the amount of reducing components has become greater than or equal to the OK determination threshold.

Preferably, the deterioration regenerating means performs the regeneration processing for the nitrogen oxide removing means by setting the air-fuel ratio to a rich region with respect to the stoichiometric ratio in an engine operating condition where the temperature of the nitrogen oxide removing means becomes higher than a predetermined temperature.

More preferably, the deterioration regenerating means sets an execution time for the regeneration processing according to a rotational speed of the engine and an intake air pressure of the engine.

Other objects and features of the invention will be more fully understood from the following detailed description and appended claims when taken with the accompanying drawings.

BRIEF DESCRIPTION OF THE DRAWINGS

FIGS. 14A to 14H are time charts for illustrating the deterioration determination processing and the SOx removal processing.

DETAILED DESCRIPTION OF THE PREFERRED EMBODIMENTS

The currently preferred embodiments of the present invention will now be described with reference to the drawings.

Figure 1:
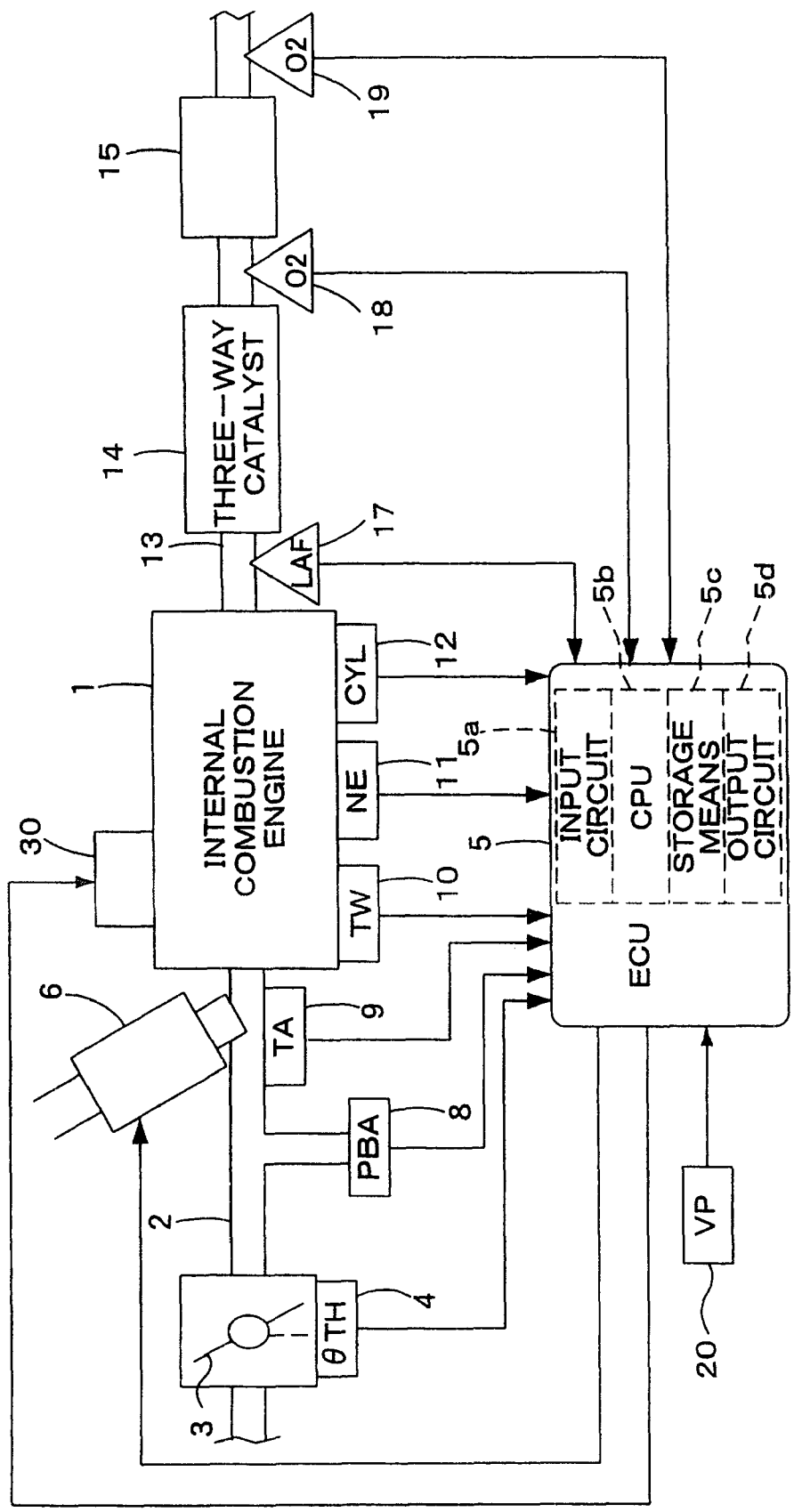
FIG. 1 is a schematic diagram showing the configuration of an internal combustion engine and an exhaust emission control system therefor according to a first preferred embodiment of the present invention.

Referring to FIG. 1, there is schematically shown a general configuration of an internal combustion engine (which will be hereinafter referred to as "engine") and a control system therefor, including an exhaust emission control system according to a preferred embodiment of the present invention. The engine 1 may be a four-cylinder engine. Engine 1 has an intake pipe 2 provided with a throttle valve 3. A throttle valve opening angle (θ TH) sensor 4 is connected to the throttle valve 3. The sensor 4 outputs an electrical signal corresponding to an opening angle of the throttle valve 3 and supplies the electrical signal to an electronic control unit (which will be hereinafter referred to as "ECU") 5 for controlling engine 1.

Fuel injection valves 6, only one of which is shown, are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8, is supplied to the ECU 5. An intake air temperature (TA) sensor 9 is provided downstream of the absolute intake pressure sensor 8 to detect an intake air temperature TA. An electrical signal corresponding to the detected intake air temperature TA, is outputted from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

An engine rotational speed (NE) sensor 11 and a cylinder discrimination (CYL) sensor 12 are mounted in facing relation to a camshaft or a crankshaft (both not shown) of the engine 1. The engine rotational speed sensor 11 outputs a TDC signal pulse at a crank angle position located at a predetermined crank angle before the top dead center (TDC) corresponding to the start of an intake stroke of each cylinder of the engine 1 (at every 180° crank angle in the case of a four-cylinder engine). The cylinder discrimination sensor 12 outputs a cylinder discrimination signal pulse at a predetermined crank angle position for a specific cylinder of engine 1. These signal pulses output from the sensors 11 and 12 are supplied to the ECU 5.

An exhaust pipe 13 of the engine 1 is provided with a three-way catalyst 14 and an NOx removing device 15 as a nitrogen oxide removing means arranged downstream of the three-way catalyst 14.

The three-way catalyst 14 has an oxygen storing capacity, and has the function of storing some of the oxygen contained in the exhaust gases in the exhaust lean condition where the air-fuel ratio of an air-fuel mixture to be supplied to the engine 1 is set in a lean region with respect to the stoichiometric ratio and the oxygen concentration in the exhaust gases is therefore relatively high. The three-way catalyst 14 also has the function of oxidizing HC and CO contained in the exhaust gases by using the stored oxygen in the exhaust rich condition where the air-fuel ratio of the air-fuel mixture to be supplied to the engine 1 is set in a rich region with respect to the stoichiometric ratio and the oxygen concentration in the exhaust gases is therefore low with a large proportion of HC and CO components.

The NOx removing device 15 includes an NOx absorbent for absorbing NOx and a catalyst for accelerating oxidation and reduction.

As the NOx absorbent, a storage type absorbent or an adsorption type absorbent is used. The storage type absorbent stores NOx in the exhaust lean condition where the air-fuel ratio of the air-fuel mixture to be supplied to the engine 1 is set in a lean region with respect to the stoichiometric ratio and the oxygen concentration in the exhaust gases is therefore relatively high (the proportion of NOx is large). The storage type absorbent discharges the stored NOx in the exhaust rich condition where the air-fuel ratio of the air-fuel mixture supplied to engine 1 is in the vicinity of the stoichiometric ratio or in a rich region with respect to the stoichiometric ratio and the oxygen concentration in the exhaust gases is therefore relatively low. On the other hand, the adsorption type absorbent adsorbs NOx in the exhaust lean condition and reduces NOx in the exhaust rich condition. In any case, the NOx absorbent in the NOx removing device 15 functions to absorb NOx in the exhaust lean condition and to discharge the absorbed NOx in the exhaust rich condition, thereby reducing the discharged NOx into nitrogen gas by HC and CO and oxidizing the HC and CO into water vapor and carbon dioxide. An example of the storage type NOx absorbent includes barium oxide (BaO), and examples of the adsorption type NOx absorbent include the combination of sodium (Na) and titanium (Ti) and the combination of strontium (Sr) and titanium (Ti). Further, examples of the catalyst in the NOx removing device 15 include noble metals such as rhodium (Rh), palladium (Pd), and platinum (Pt) both in the storage type and in the adsorption type.

When the amount of NOx absorbed by the NOx absorbent reaches the limit of its NOx absorbing capacity, i.e., the maximum NOx absorbing amount, the NOx absorbent cannot absorb any more NOx. Accordingly, to discharge the absorbed NOx and reduce it, the air-fuel ratio is enriched, that is, reduction enrichment of the air-fuel ratio is performed.

A proportional type air-fuel ratio sensor (which will be hereinafter referred to as "LAF sensor") 17 is mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5.

A binary type oxygen concentration sensor (which will be hereinafter referred to as "O2 sensor") 18 is mounted on the exhaust pipe 13 at a position between the three-way catalyst 14 and the NOx removing device 15, and an O2 sensor 19 is mounted on the exhaust pipe 13 at a position downstream of the NOx removing device 15. Detection signals from these sensors 18 and 19 are supplied to the ECU 5. Each of the O2 sensors 18 and 19 has a characteristic such that its output rapidly changes in the vicinity of the stoichiometric ratio. More specifically, the output from each of the sensors 18 and 19 has a high level in a rich region with respect to the stoichiometric ratio, and outputs a low level signal in a lean region with respect to the stoichiometric ratio.

The engine 1 has a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of such a type that the switching of the valve timing is carried out hydraulically. That is, a solenoid valve for performing the hydraulic switching and an oil pressure sensor are connected to the ECU 5. A detection signal from the oil pressure sensor is supplied to. the ECU 5, and the ECU 5 controls the solenoid valve to perform the switching control of the valve timing according to an operating condition of the engine 1.

A vehicle speed sensor 20 detects the running speed (vehicle speed) VP of a vehicle driven by engine 1. The speed sensor 20 is connected to the ECU 5, and supplies a detection signal to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") 5b, storage means 5c preliminarily storing various operational programs to be executed by the CPU 5b and for storing the results of computation or the like by the CPU 5b, and an output circuit 5d for supplying drive signals to the fuel injection valves 6.

The CPU 5b determines various engine operating conditions according to various engine operating parameter signals as mentioned above, and calculates a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times K1 + K2 \qquad (1)$$

TIM is a basic fuel amount, more specifically, a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) per unit time by the engine.

KCMD is a target air-fuel ratio coefficient, which is set according to engine operational parameters such as the engine rotational speed NE, the throttle valve opening angle θ TH, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is referred to also as a target equivalent ratio. Further, in the case of executing reduction enrichment or determination of deterioration of the NOx removing device 15 to be hereinafter described, the target air-fuel ratio coefficient KCMD is set to a predetermined enrichment value KCMDRR or KCMDRM for enrichment of an air-fuel ratio.

KLAF is an air-fuel ratio correction coefficient calculated by PID control so that a detected equivalent ratio KACT calculated from a detected value from the LAF sensor 17 becomes equal to the target equivalent ratio KCMD in the case that the conditions for execution of feedback control are satisfied.

K1 and K2 are another correction coefficient and correction variable computed according to various engine parameter signals, respectively. The correction coefficient K1 and correction variable K2 are predetermined values that optimize various characteristics such as fuel consumption characteristics and engine acceleration characteristics according to engine operating conditions.

The CPU 5b supplies a drive signal for opening each fuel injection valve 6 according to the fuel injection period TOUT obtained above through the output circuit 5d to the fuel injection valve 6.

Figure 2:
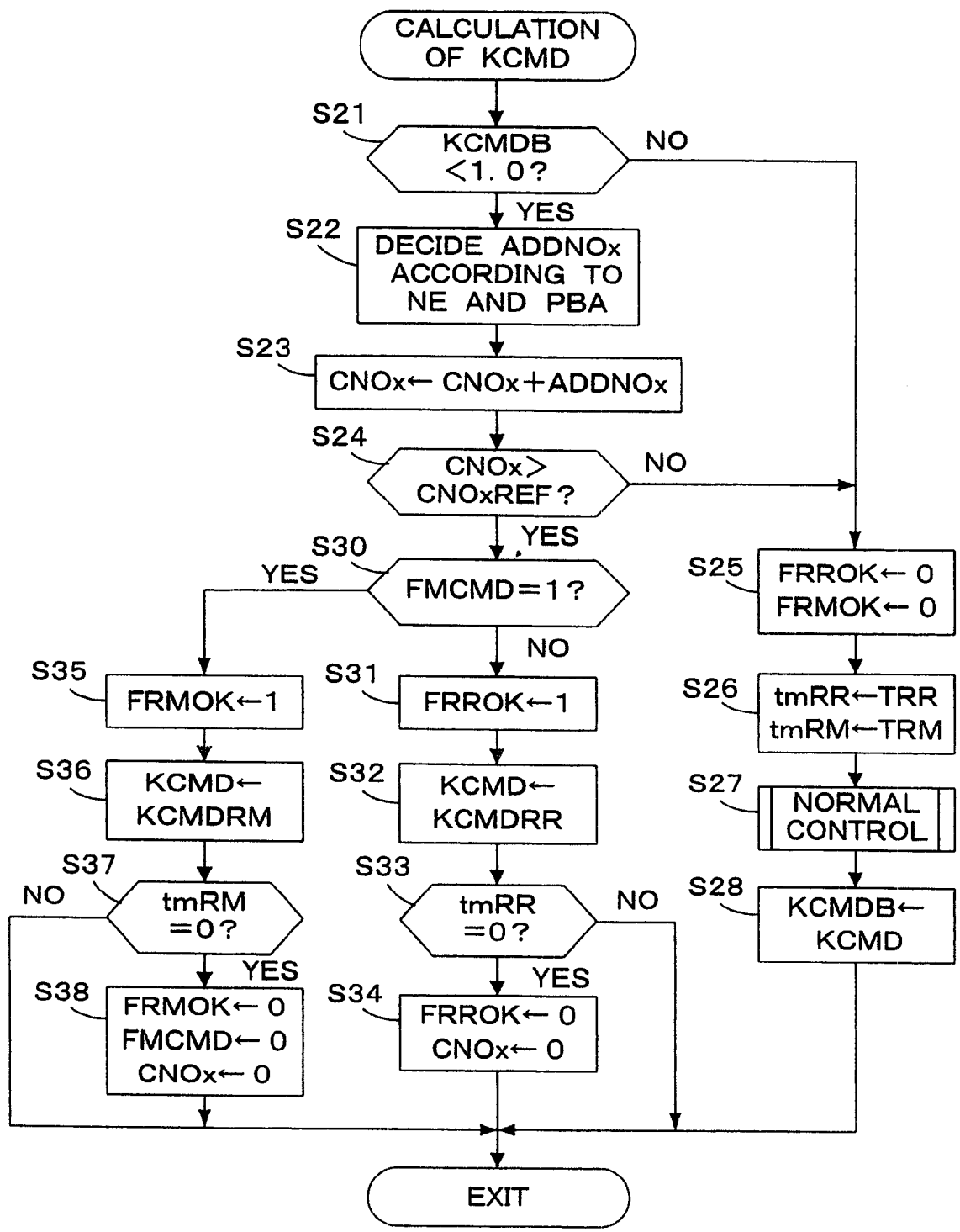
FIG. 2 is a flowchart showing a program for calculating a target air-fuel ratio coefficient (KCMD) in the first preferred embodiment.

FIG. 2 is a flowchart showing a program for calculating the target air-fuel ratio coefficient KCMD applied to Eq. (1) mentioned above. This program is executed by the CPU 5b at predetermined time intervals.

In step S21, it is determined whether or not the engine 1 is in a lean operating condition, that is, whether or not a stored value KCMDB of the target air-fuel ratio coefficient KCMD stored in step S28 to be hereinafter described during normal control is smaller than "1.0". If KCMDB is greater than or equal to "1.0", that is, if the engine 1 is not in the lean operating condition, the program proceeds directly to step S25, in which a reduction enrichment flag FRROK indicating the duration of execution of reduction enrichment by "1" is set to "0", and a deterioration determination enrichment flag FRMOK indicating the duration of execution of air-fuel ratio enrichment for determination of deterioration of the NOx removing device 15 by "1" is also set to "0". Thereafter, a reduction enrichment time TRR (e.g., 5 to 10 sec) is set to a downcount timer tmRR to be referred to in step S33, described below, and a deterioration determination enrichment time TRM longer than the reduction enrichment time TRR is set to a downcount timer tmRM to be referred in step S37, also described below. Then, the timers tmRR and tmRM are started (step S26). Normal control is performed to set the target air-fuel ratio coefficient KCMD according to engine operating conditions (step S27). Basically, the target air-fuel ratio coefficient KCMD is set according to the engine rotational speed NE and the absolute intake pressure PBA. However, in the condition where the engine coolant temperature TW is low or engine 1 is in a predetermined high-load operating condition, the value of the target air-fuel ratio coefficient KCMD is set according to these conditions. Then, the target air-fuel ratio coefficient KCMD calculated in step S27 is stored as a stored value KCMDB (step S28), and this program ends.

If KCMDB is less than "1.0" in step S21, that is, if the engine 1 is in the lean operating condition, an increment value ADDNOx to be used in step S23 is determined according to the engine rotational speed NE and the absolute intake pressure PBA (step S22). The increment value ADDNOx is a parameter corresponding to the amount of NOx exhausted per unit time during the lean operation. This parameter increases with an increase in the engine rotational speed NE and with an increase in the absolute intake pressure PBA.

In step S23, the increment value ADDNOx decided in step S22 is applied to the following expression to increment an NOx amount counter CNOx, thereby obtaining an NOx exhaust amount, that is, a count value corresponding to the amount of NOx absorbed by the NOx absorbent.

$$CNOx = CNOx + ADDNOx$$

In step S24, it is determined whether or not the current value of the NOx amount counter CNOx has exceeded an allowable value CNOxREF. If the answer to step S24 is negative (NO), the program proceeds to step S25, in which the normal control is performed, that is, the target air-fuel ratio coefficient KCMD is set according to engine operating conditions. The allowable value CNOxREF is set to a value corresponding to an NOx amount slightly smaller than the maximum NOx absorption amount of the NOx absorbent.

If CNOx is greater than CNOxREF in step S24, then it is determined whether or not a deterioration determination command flag FMCMD is "1" (step S30). This flag set to "1" indicates that the execution command for the deterioration determination for the NOx removing device 15 is active.

It is sufficient to execute the deterioration determination for the NOx removing device 15 about once per engine operation period (a period from starting to stopping of the engine). Therefore, the deterioration determination command flag FMCMD is set to "1" at the time the engine operating condition becomes stable after starting the engine. Usually the flag FMCMD is set to "0". Therefore, the program proceeds from step S30 to step S31, in which the reduction enrichment flag FRROK is set to "1". Subsequently, the target air-fuel ratio coefficient KCMD is set to a predetermined enrichment value KCMDRR corresponding to a value equivalent to an air-fuel ratio of 14.0, thus executing reduction enrichment (step S32). Then, it is determined whether or not the current value of the timer tmRR is "0" (step S33). If tmRR is not "0", this program ends. When tmRR equals "0", the reduction enrichment flag FRROK is set to "0" and the current value of the NOx amount counter CNOx is reset to "0" (step S34).

Accordingly, the answer to step S24 subsequently becomes negative (NO), so that the normal control is then performed.

If CNOx is greater than CNOxREF in step S24, in the condition where the deterioration determination command has been issued (FMCMD =1), the program proceeds from step S30 to step S35, in which the deterioration determination enrichment flag FRMOK is set to "1". Subsequently, the target air-fuel ratio coefficient KCMD is set to a predetermined deterioration determination enrichment value KCMDRM (1<KCMDRM<KCMDRR) corresponding to a value slightly shifted to the lean region from a value equivalent to an air-fuel ratio of 14.0, thus executing reduction enrichment (step S36). The reason for making the degree of enrichment smaller in the execution of deterioration determination than the degree of enrichment of the usual reduction enrichment is that if the degree of enrichment is large and the enrichment execution time is short, an improper determination may occur. Accordingly, by reducing the degree of enrichment and increasing the enrichment execution time TRM, the accuracy of deterioration determination can be improved.

Subsequently, it is determined whether or not the current value of the timer tmRM is "0" (step S37). If tmRM does not equal 0, this program ends. When tmRM equals "0", both the deterioration determination enrichment flag FRMOK and the deterioration determination command flag FMCMD are set to "0", and the current value of the NOx amount counter CNOx is reset to "0" (step S38). Accordingly, the answer to step S24 subsequently becomes negative (NO), so that the normal control is then performed.

Figure 3:
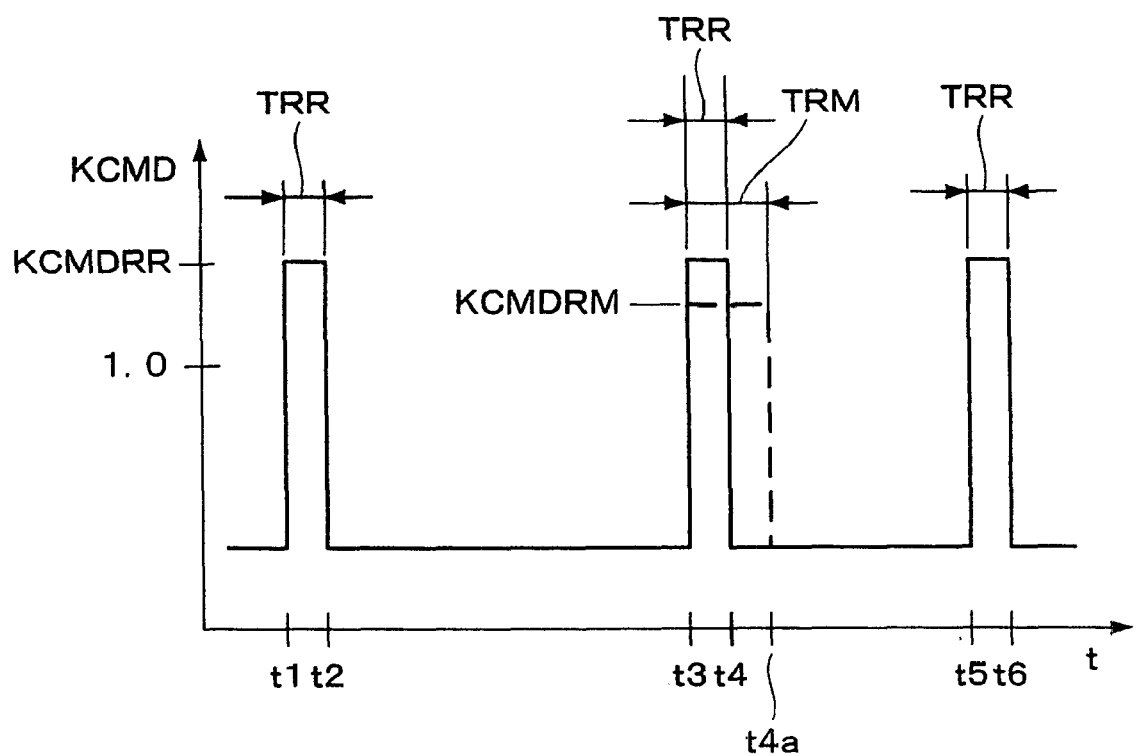
FIG. 3 is a time chart for illustrating the setting of the target air-fuel ratio coefficient during a lean operation.

According to the processing shown in FIG. 2, the reduction enrichment is executed intermittently as shown by a solid line in FIG. 3 (during a time period between t1 and t2, a time period between t3 and t4, and a time period between t5 and t6) in an engine operating condition where the lean operation is permitted, so that NOx absorbed by the NOx absorbent in the NOx removing device 15 is discharged at appropriate intervals. Further, in the case that the deterioration determination command is issued before the time t3, for example, the deterioration determination enrichment is executed so that the degree of enrichment is made smaller than the degree of the reduction enrichment and that the execution time period is made longer (TRM=a time period between t3 and t4a) than the execution time period of the reduction enrichment.

Figure 4:
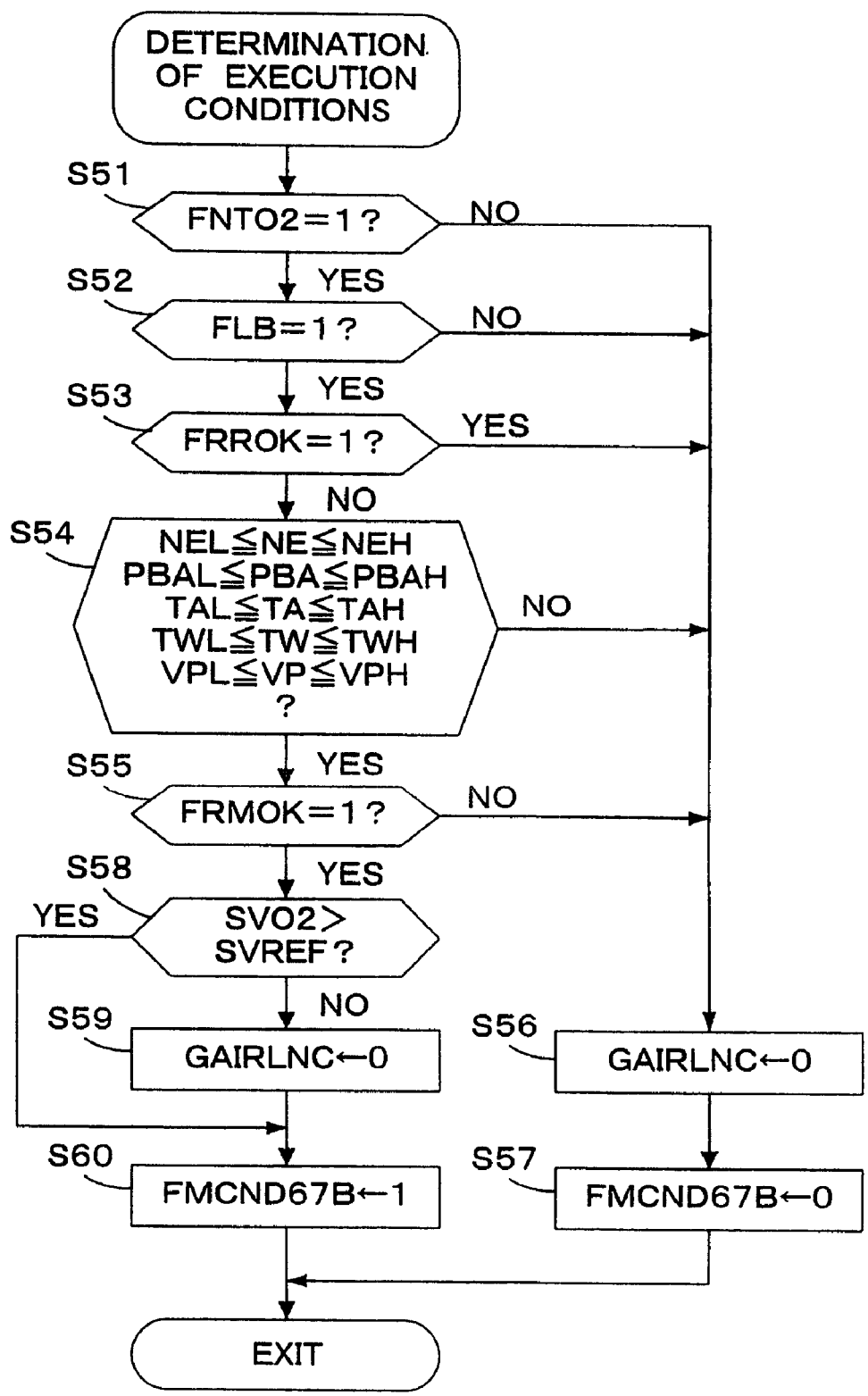
FIG. 4 is a flowchart showing a program for determining execution conditions of deterioration determination of a NOx removing device.

FIG. 4 is a flowchart showing a program for determining execution conditions of deterioration determination for the NOx removing device 15. This program is executed by the CPU 5b in synchronism with the generation of a TDC signal pulse.

In step S51, it is determined whether or not an activation flag FNT02 is "1", indicating the activated condition of the downstream O2 sensor 19. If FNTO2 is "1", that is, if the downstream O2 sensor 19 has been activated, it is then determined whether or not a lean operation flag FLB is "1", indicating the permission for lean operation, in which the airfuel ratio is set in a lean region with respect to the stoichiometric ratio (step S52). If FLB is "1", it is then determined whether or not the reduction enrichment flag FRROK is "1" (step S53).

If the answer to step S51 or S52 is negative (NO) or the answer to step S53 is affirmative (YES), an exhaust amount parameter GAIRLNC is set to "0" (step S56). GAIRLNC is calculated and used in the processing shown in FIG. 5 described below. Thereafter, the execution conditions flag FMCND67B is set to "0". Flag FMCND67B indicates the satisfaction of execution conditions of the deterioration determination when set to "1" (step S57). Then, this program ends.

If the answer to step S51 or S52 is affirmative (YES) and the answer to step S53 is negative (NO), it is then determined whether or not the engine operating condition is normal (step S54). More specifically, it is determined whether or not the engine rotational speed NE is in the range of a predetermined upper limit NEH (e.g., 3000 rpm) to a predetermined lower limit NEL (e.g., 1200 rpm), the absolute intake pressure PBA is in the range of a predetermined upper limit PBAH (e.g., 88 kPa) to a predetermined lower limit PBAL (e.g., 21 kPa), the intake air temperature TA is in the range of a predetermined upper limit TAH (e.g., 100° C.) to a predetermined lower limit TAL (e.g., −7° C.), the engine coolant temperature TW is in the range of a predetermined upper limit TWH (e.g., 100° C.) to a predetermined lower limit TWL (e.g., 75° C.), and the vehicle speed VP is in the range of a predetermined upper limit VPH (e.g., 120 km/h) to a predetermined lower limit VPL (e.g., 35 km/h). If at least one of these conditions is not satisfied, the answer to step S54 becomes negative (NO) and the program proceeds to step S56, whereas if all of these conditions are satisfied, the answer to step S54 becomes affirmative (YES) and the program proceeds to step S55, in which it is determined whether or not the deterioration determination enrichment flag FRMOK is "1".

Before the NOx amount absorbed by the NOx absorbent in the NOx removing device 15 becomes almost maximum (saturated condition) and the deterioration determination enrichment flag FRMOK is set to "1" in the processing of FIG. 2, the program proceeds from step S55 to step S56. If FRMOK is "1", it is then determined whether or not an output voltage SVO2 from the upstream O2 sensor 18 has exceeded a reference voltage SVREF corresponding to the stoichiometric ratio (step S58). During a certain period of time after starting the deterioration determination enrichment, HC and CO are oxidized in the three-way catalyst 14, so that the output voltage SVO2 continues to be smaller than the reference voltage SVREF. Accordingly, the program proceeds from step S58 to step S59, in which the exhaust amount parameter GAIRLNC is set to "0". Then, the execution conditions flag FMCND67B is set to "1" (step S60), and this program ends.

When the oxygen stored in the three-way catalyst 14 becomes absent and the exhaust condition in the vicinity of the O2 sensor 18 becomes an exhaust rich condition, the output voltage SVO2 exceeds the reference voltage SVREF. Accordingly, the program proceeds from step S58 directly to step S60 without the execution of step S59.

Figure 5:
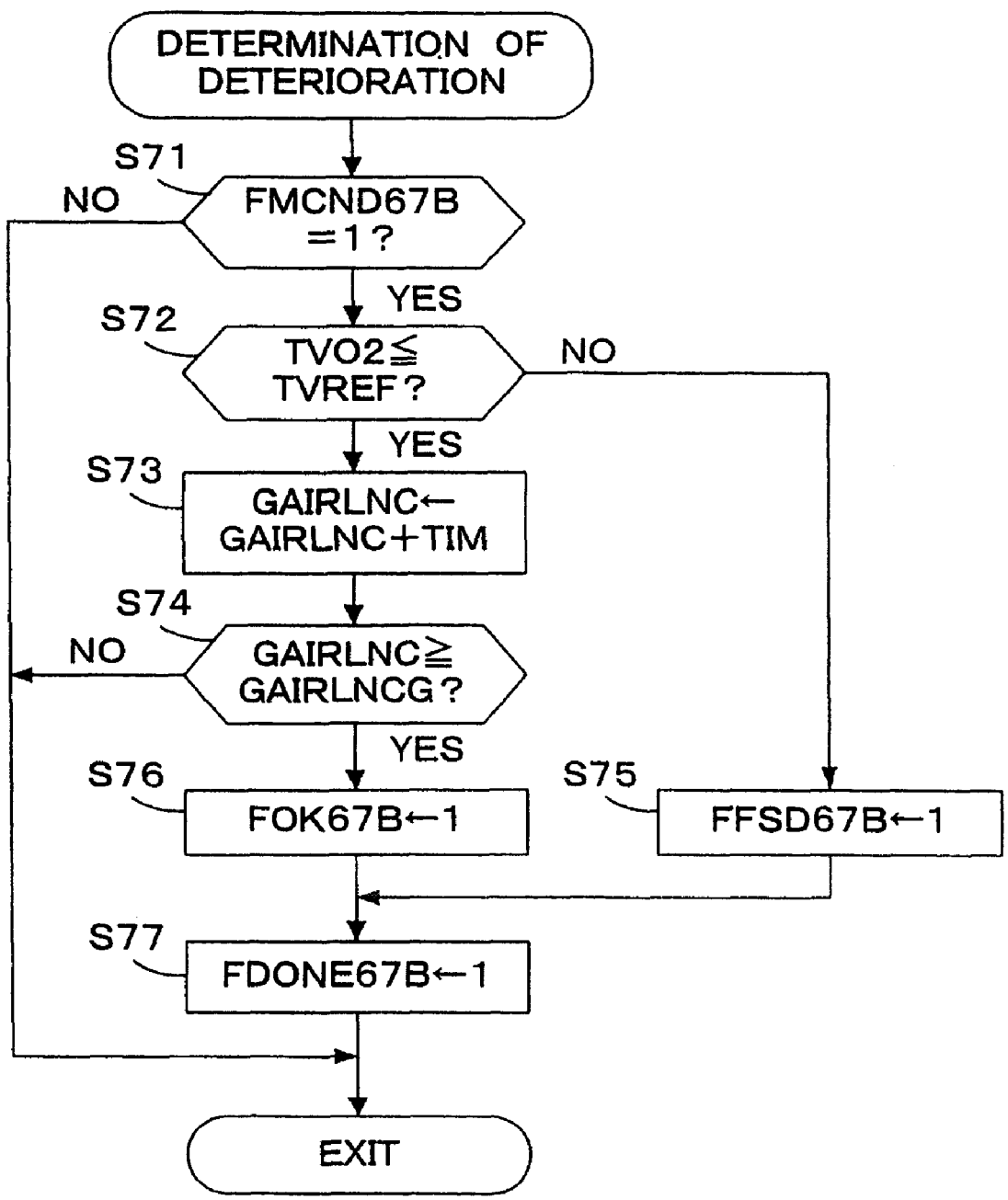
FIG. 5 is a flowchart showing a program for executing the deterioration determination of the NOx removing device in the first preferred embodiment.

FIG. 5 is a flowchart showing a program for determining deterioration of the NOx removing device 15. This program is executed by the CPU 5b in synchronism with the generation of a TDC signal pulse.

In step S71, it is determined whether or not the execution conditions flag FMCND67B is "1". If FMCND67B is "0", which indicates that the execution conditions are not satisfied, this program ends. If FMCND67B is "1", it is then determined whether or not an output voltage TVO2 from the downstream O2 sensor 19 is less than or equal to a reference voltage TVREF corresponding to the stoichiometric ratio (step S72). Immediately after the execution conditions flag FMCND67B becomes "1", TVO2 is less than or equal to TVREF, so that the program proceeds to step S73, in which the exhaust amount parameter GAIRLNC is calculated from Eq. (2).

$$GAIRLNC = GAIRLNC + TIM \quad (2)$$

where TIM is a basic fuel amount, which is a fuel amount set so that the air-fuel ratio becomes the stoichiometric ratio according to an engine operating condition (engine rotational speed NE and absolute intake pressure PBA). Therefore, TIM is a parameter proportional to an intake air amount per unit time by the engine 1, and accordingly, proportional to an exhaust amount per unit time by the engine 1. While SVO2 is less than or equal to SVREF, the exhaust amount parameter GAIRLNC is kept at "0" by the processing of FIG. 4. Accordingly, the exhaust amount parameter GAIRLNC indicative of a cumulative value of the amount of exhaust gases flowing into the NOx removing device 15 from the time the output voltage SVO2 from the upstream O2 sensor 18 exceeds the reference voltage SVREF, is obtained by the calculation of step S73. Further, during the execution of the deterioration determination, the air-fuel ratio is maintained at a fixed rich air-fuel ratio (a value corresponding to KCMDRM) in a rich region with respect to the stoichiometric ratio. Therefore, the exhaust amount parameter GAIRLNC has a value proportional to a cumulative value of the amount of reducing components (HC and CO) contained in the exhaust gases.

In step S74, it is determined whether or not the exhaust amount parameter GAIRLNC is greater than or equal to a predetermined threshold GAIRLNCG. Since GAIRLNC is less than GAIRLNCG at first, this program ends. Thereafter, when the exhaust amount parameter GAIRLNC becomes equal to or greater than the predetermined threshold GAERLNCG in the condition where the output voltage TVO2 from the downstream O2 sensor 19 is less than or equal to the reference voltage TVREF, the program proceeds from step S74 to step S76, in which the NOx removing device 15 is determined to be normal and a normality flag FOK67B is set to "1", indicating the normality of the NOx removing device 15. Then, an end flag FDONE67B is set to "1", indicating the end of the deterioration determination (step S77), and this program ends.

On the other hand, if the output voltage TVO2 from the downstream O2 sensor 19 exceeds the reference voltage TVREF before the exhaust amount parameter GAIRLNC becomes equal to or greater than the predetermined threshold GAIRLNCG, the NOx removing device 15 is determined to be deteriorated. Then, the program proceeds from step S72 to step S75, in which a deterioration flag FFSD67B is set to "1", indicating the deterioration of the NOx removing device 15. Then, the program proceeds to step S77.

The predetermined threshold GAIRLNCG is set, for example, to a value corresponding to about ½ of the exhaust amount required to reduce all of the amount of NOx absorbed by a new NOx removing device. In this case, if the output voltage TVO2 from the downstream O2 sensor 19 becomes a value indicative of a rich air-fuel ratio (a value greater than the reference voltage TVREF) before the exhaust amount parameter GAIRLNC becomes equal to or greater than the predetermined threshold GAIRLNCG, it is indicated that the NOx storing capacity of the NOx removing device 15 has been reduced to about ½ or less of that of the new one. Alternatively, the predetermined threshold GAIRLNCG may be set so as to detect that the NOx storing capacity has been reduced to about ⅒ of that of a new NOx removing device. Thus, the predetermined threshold GAIRLNCG may be set to any suitable value according to the deterioration level intended to be detected.

Figure 6A:
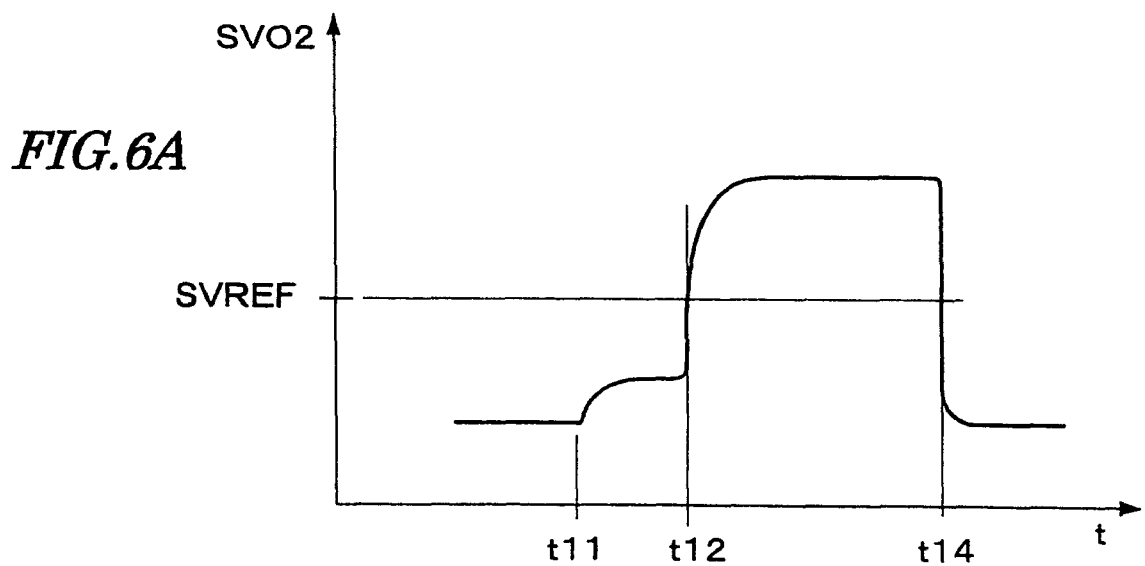
FIGS. 6A and 6B are time charts for illustrating changes in output values from two oxygen concentration sensors with time.
Figure 6B:
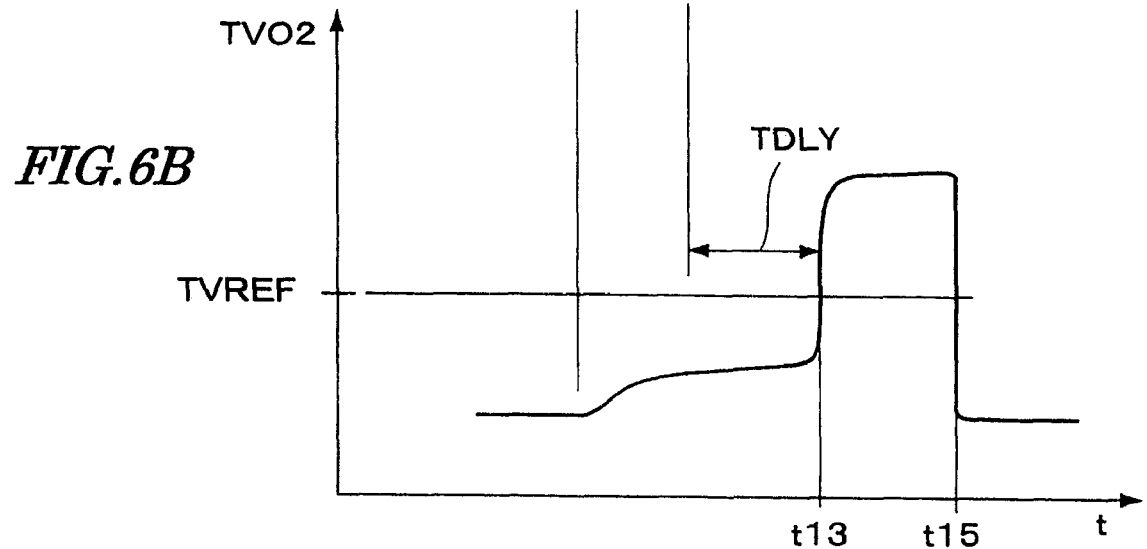

FIGS. 6A and 6B are time charts for illustrating the processings of FIGS. 4 and 5. More specifically, there are shown changes in the output voltage SVO2 from the upstream O2 sensor 18 and the output voltage TVO2 from the downstream O2 sensor 19 in the case that the deterioration determination enrichment flag FRMOK is set to "1"

at the time t11. If the exhaust amount parameter GAIRLNC exceeds the predetermined threshold GAIRLNCG before the time t13 (i.e., during the period shown by TDLY), it is indicated that the NOx removing device 15 has the required NOx storing capacity, so that the NOx removing device 15 is determined to be normal. In contrast, if the exhaust amount parameter GAIRLNC does not exceed the predetermined threshold GAIRLNCG before the time t13, it is indicated that the NOx storing capacity is insufficient, so that the NOx removing device 15 is determined to be deteriorated.

In the preferred embodiment as described above, the exhaust amount parameter GAIRLNC indicative of the amount of exhaust gases, i.e., the amount of reducing components, flowing into the NOx removing device 15 from the time when the output voltage SVO2 from the upstream O2 sensor 18 has changed to a value corresponding to a rich air-fuel ratio after starting the deterioration determination enrichment is calculated. Further, if the output voltage TVO2 from the downstream O2 sensor 19 becomes a value corresponding to a rich air-fuel ratio before the calculated exhaust amount parameter GAIRLNC reaches the predetermined threshold GAIRLNCG, it is determined that the NOx removing device 15 is deteriorated. Accordingly, the deterioration determination for the NOx removing device 15 can be performed according to the amount of exhaust gases, i.e., the amount of reducing components, changing with an engine operating condition, thus allowing precise deterioration determination over a wide range of engine operating conditions.

In the above preferred embodiment, steps S56, S58 and S59 in FIG. 4 and step S73 in FIG. 5 correspond to the reducing-component amount calculating means, and steps S72 and S74 to S76 in FIG. 5 correspond to the deterioration determining means. Further, the O2 sensors 18 and 19 correspond to the first and second oxygen concentration sensors, respectively.

Various modifications of the above preferred embodiment may be made. For example, the processing of FIG. 5 may be modified to the processing shown in FIG. 7 or 8.

Figure 7:
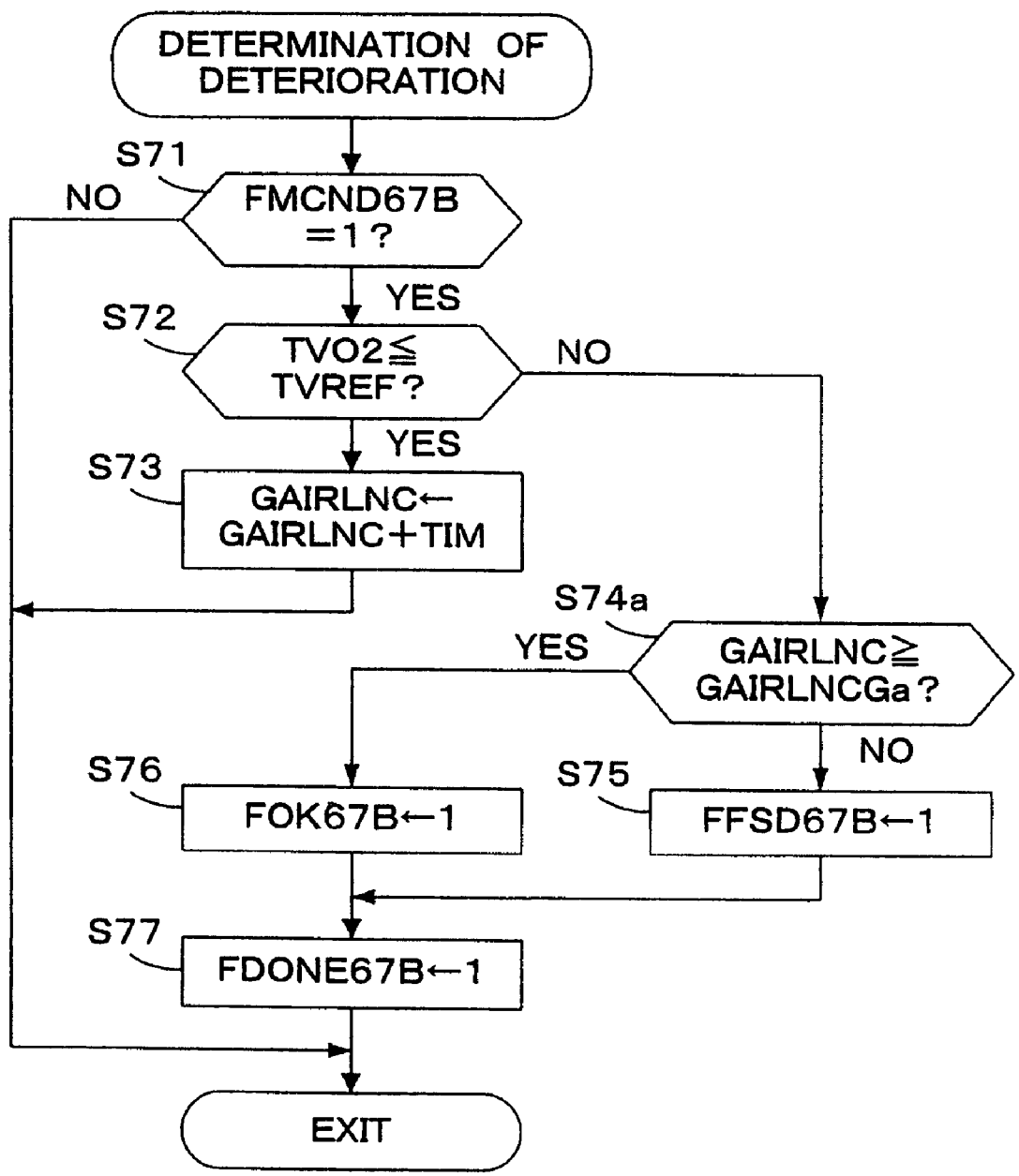
FIG. 7 is a flowchart showing a modification of the processing shown in FIG. 5.

The processing of FIG. 7 is provided by changing step S74 in FIG. 5 into step S74a and changing the position of the step S74a. According to 30 the processing of FIG. 7, if the exhaust amount parameter GAIRLNC is greater than or equal to a predetermined threshold GAIRLNCGa at the time the output voltage TVO2 from the downstream O2 sensor 19 has exceeded the reference voltage TVREF, the NOx removing device 15 is determined to be normal, whereas if not so, the NOx removing device 15 is determined to be deteriorated. The predetermined threshold GAIRLNCGa is set to a value slightly larger than the predetermined threshold GAIRLNCG shown in FIG. 5.

Figure 8:
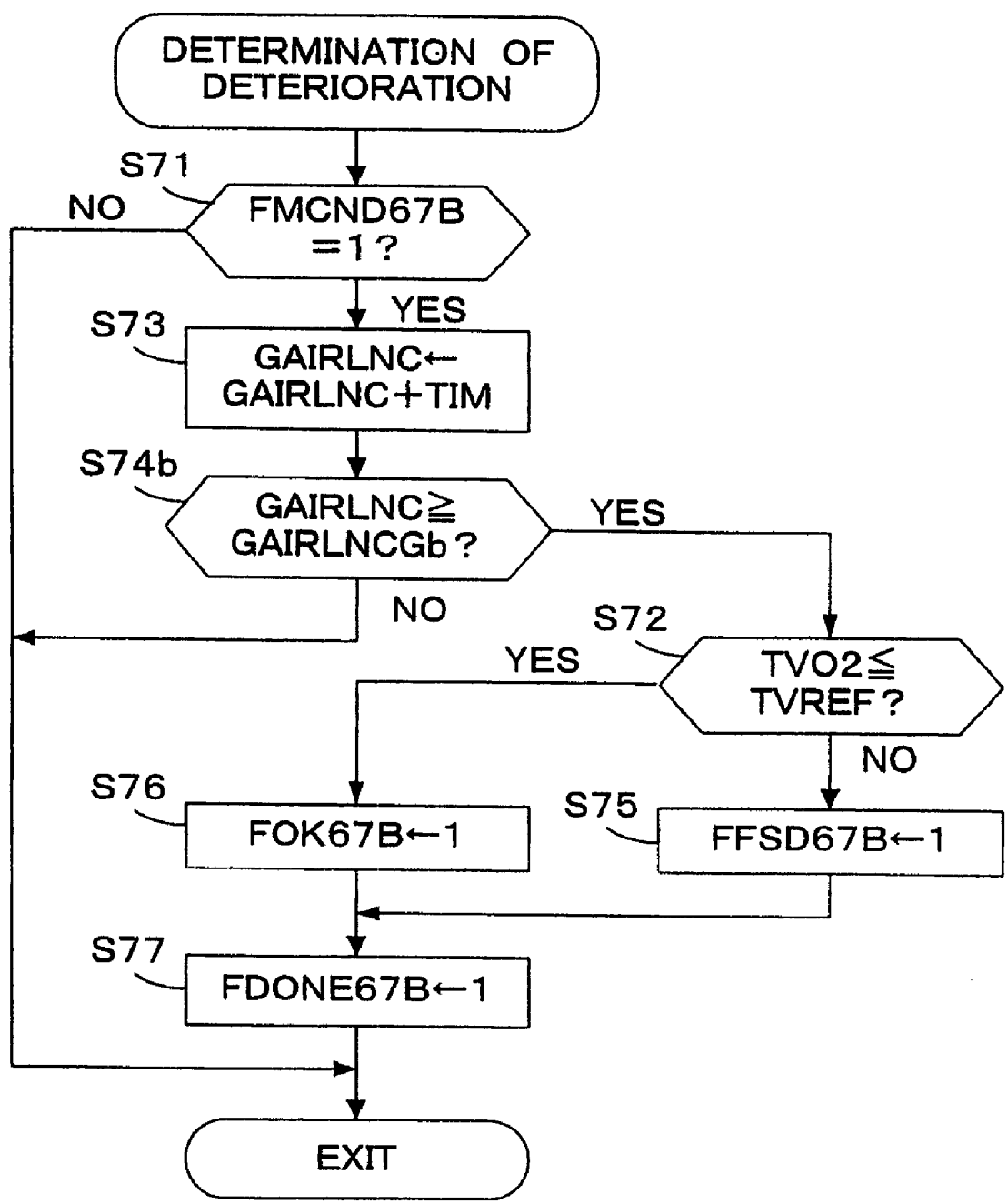
FIG. 8 is a flowchart showing another modification of the processing shown in FIG. 5.

On the other hand, the processing of FIG. 8 is provided by changing the position of step S72 shown in FIG. 5 and changing step S74 shown in FIG. 5 into step S74b. According to the processing of FIG. 8, if the output voltage TVO2 from the downstream O2 sensor 19 is less than or equal to the reference voltage TVREF at the time the exhaust amount parameter GAIRLNC has become greater than or equal to a predetermined threshold GAIRLNCGb, the NOx removing device 15 is determined to be normal, whereas if not so, the NOx removing device 15 is determined to be deteriorated. The predetermined threshold GAIRLNCGb is set to a value slightly smaller than the predetermined threshold GAIRLNCG shown in FIG. 5.

Second Preferred Embodiment

This preferred embodiment is the same as the first preferred embodiment except the points described below.

Figure 9:
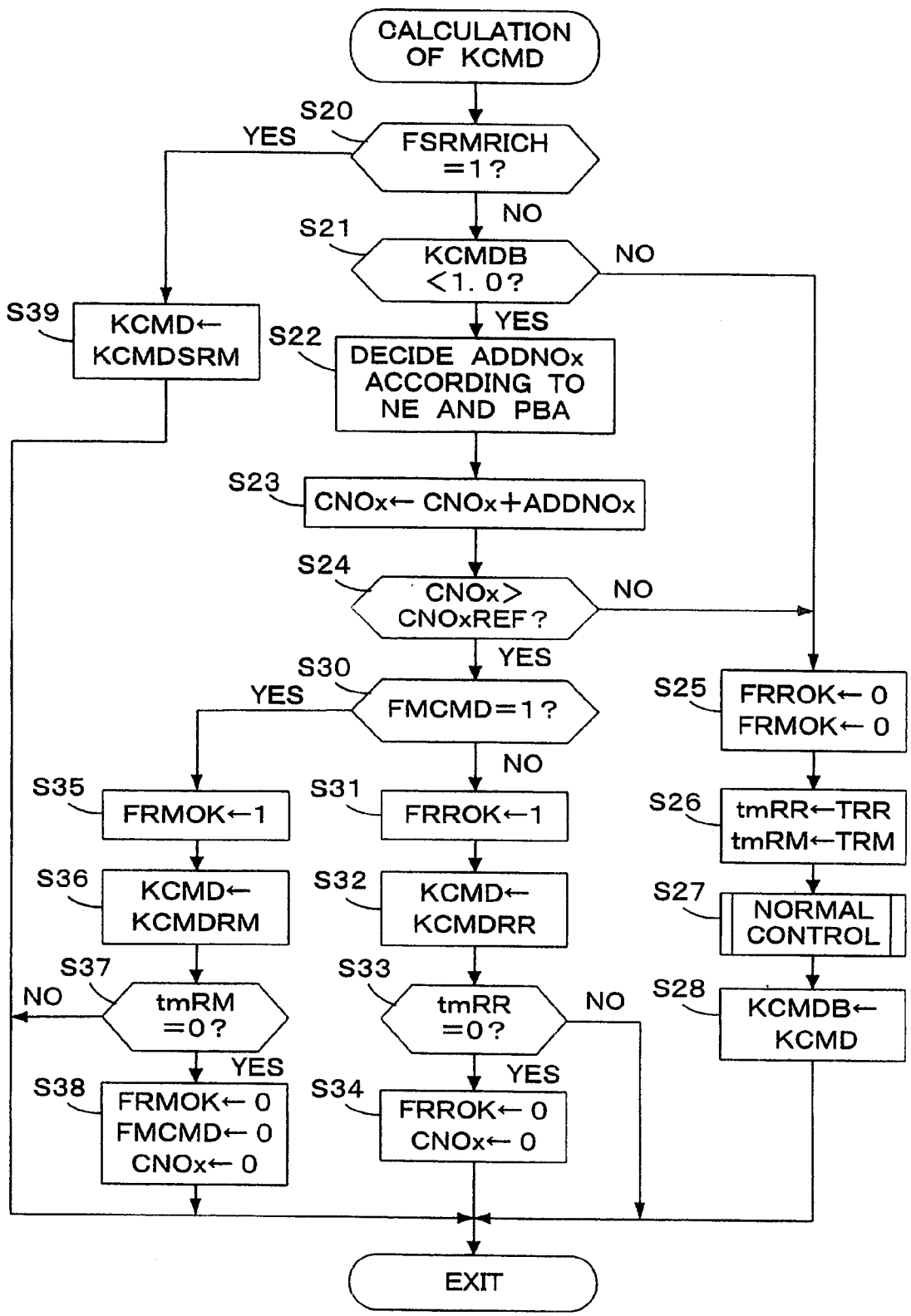
FIG. 9 is a flowchart showing a program for calculating a target airfuel ratio coefficient (KCMD) in a second preferred embodiment of the present invention.

FIG. 9 is a flowchart showing a program for calculating the target air-fuel ratio coefficient according to the second preferred embodiment. This program is executed by the CPU 5b at predetermined time intervals.

The processing of FIG. 9 is the same as the processing of FIG. 2 except that steps S20 and S39 are added to the processing of FIG. 2.

In step S20, it is determined whether or not an SOx removing flag FSRMRICH is set to "1", indicating the execution of air-fuel ratio enrichment for removing SOx (sulfur oxides) absorbed by the NOx absorbent in the NOx removing device 15. This SOx removing flag FSRMRICH is set in the processing of FIG. 11 described below. If FSRMRICH equals "1", which indicates execution of the air-fuel ratio enrichment for removing the SOx, the target air-fuel ratio coefficient KCMD is set to a predetermined enrichment value KCMDSRM for SOx removal processing (e.g., a value corresponding to an air-fuel ratio of about 12.5) (step S39). Then, this program ends.

If FSRMRICH does not equal "1" in step S20, the program proceeds to step S21.

According to the processing of FIG. 9, when executing the SOx removal processing, the target air-fuel ratio coefficient KCMD is set to the predetermined enrichment value KCMDSRM for the SOx removal processing.

Figure 10:
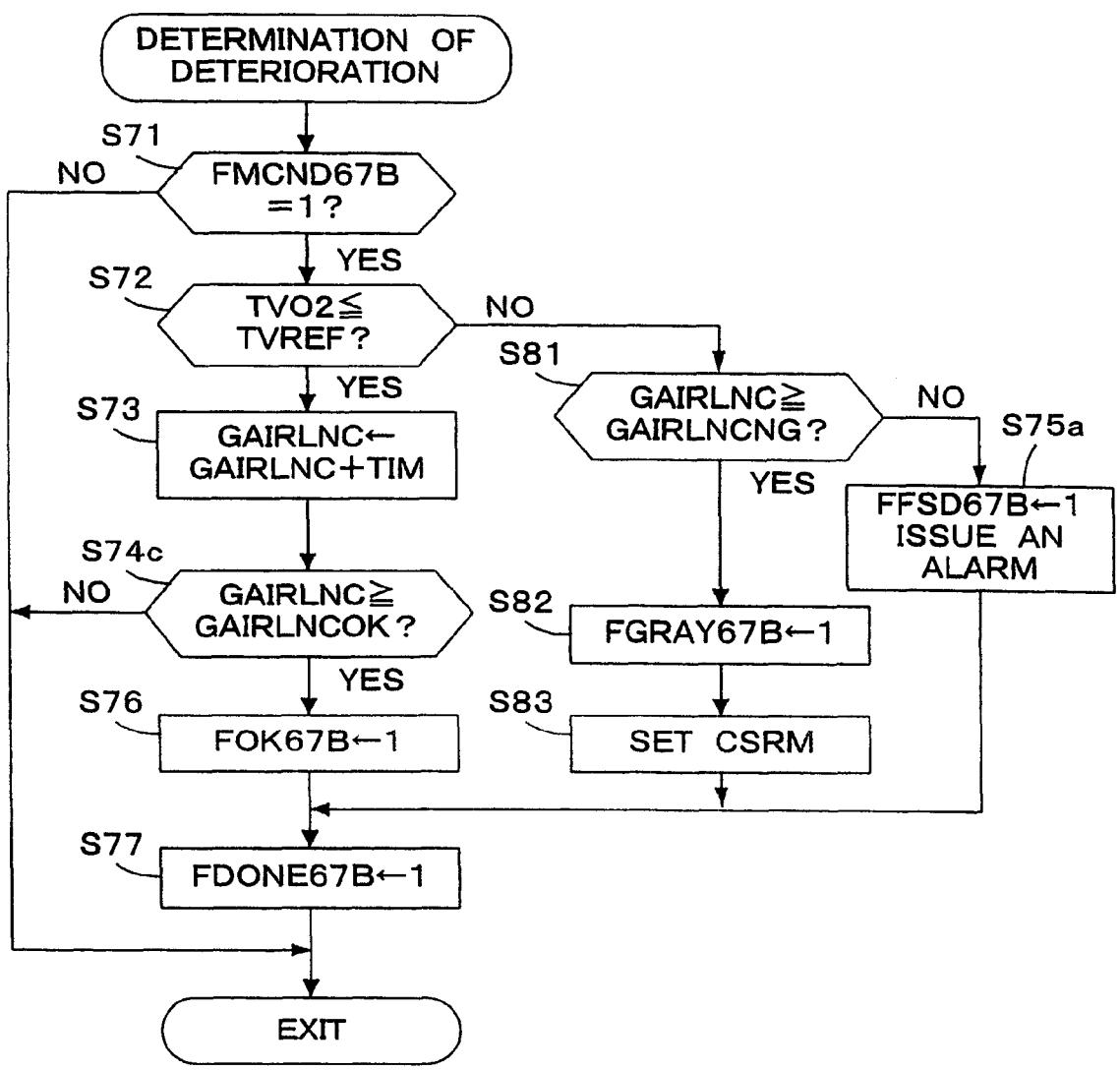
FIG. 10 is a flowchart showing a program for executing the deterioration determination of the NOx removing device in the second preferred embodiment.

FIG. 10 is a flowchart showing a program for determining deterioration of the NOx removing device 15 in the second preferred embodiment. This processing is executed by the CPU 5b in synchronism with the generation of a TDC signal pulse. 7z The processing of FIG. 10 is the same as the processing of FIG. 5 except that steps S74 and S75 in FIG. 5 are changed to steps S74c and S75a, respectively, and that steps S81 to S83 are added.

In step S74c, it is determined whether or not the exhaust amount parameter GAIRLNC is greater than or equal to an OK determination threshold GAIRLNCOK. At first, GAIRLNC is less than GAIRLNCOK, so that this program ends. If thereafter GAIRLNC is greater than or equal to GAIRLNCOK in the condition where the output voltage TVO2 from the downstream O2 sensor 19 is less than or equal to the reference voltage TVREF, the program proceeds from step S74c to step S76, in which the NOx removing device 15 is determined to be normal and a normality flag FOK67B is set to "1", indicating the normality of the NOx removing device 15. Then, an end flag FDONE67B is set to "1", indicating the end of the deterioration determination (step S77), and this program ends.

In contrast, if the output voltage TVO2 from the downstream O2 sensor 19 exceeds the reference voltage TVREF before the exhaust amount parameter GAIRLNC becomes greater than or equal to the OK threshold, the program proceeds from step S72 to step S81, in which it is determined whether or not the exhaust amount parameter GAIRLNC is greater than or equal to an NG determination threshold GAIRLNCNG, which is smaller than the OK determination threshold GAIRLNCOK. If GAIRLNC is less than GAIRLNCNG, when the output voltage TVO2 from the downstream O2 sensor 19 has changed to a value indicative of a rich air-fuel ratio in spite of a small amount of exhaust gases measured from the time the output voltage SVO2 from the upstream O2 sensor 18 has changed to a value indicative of a rich air-fuel ratio, the NOx removing device 15 is determined to be deteriorated. Then, a deterioration flag FFSD67B is set to "1" indicating the deterioration, and an alarm indicating the deterioration is given to the driver by voice or display such as an alarm lamp (step S75a). Then, the program proceeds to step S77.

If GAIRLNC is greater than or equal to GAIRLNCNG in step S81, two cases are considered. One of the two cases is that the NOx removing device 15 is deteriorated, and the other case is that SOx is absorbed by the NOx absorbent resulting in a reduction in the NOx absorbing capacity. Accordingly, the determination of deterioration is withheld, and a withholding flag FGRAY67B is set to "1" (step S82). Then, a predetermined value CSRMO is set in a down counter CSRM for controlling a duration time of SOx removal processing (step S83). The downcounter CSRM is used in the processing of FIG. 11 described below. Then, the program proceeds to step S77.

In the case that the NOx removing device 15 is normal, the value of the exhaust amount parameter GAIRLNC at the time the output voltage TVO2 from the downstream O2 sensor 19 changes to a value indicative of a rich air-fuel ratio (TVO2>TVREF) (the value of the exhaust amount parameter GAIRLNC will be hereinafter referred to as "rich inversion parameter value GAIRLNCR") becomes greater than the OK threshold GAIRLNCOK even if there is difference in characteristics of a plurality of the devices (in other words, the OK determination threshold GAIRLNCOK is set as a threshold allowing substantially reliable determination of a normal NOx removing device even if there is difference in characteristics of the NOx removing devices). However, in the case that the NOx absorbing capacity of the NOx removing device 15 is reduced by an increase in the amount of SOx absorbed by the NOx absorbent (by sulfur poisoning), the rich inversion parameter value GAIRLNCR may become smaller than the OK determination threshold GAIRLNCOK. According to this preferred embodiment, the NG determination threshold GAIRLNCNG is set as a threshold allowing substantially reliable determination of a deteriorated NOx removing device even if there is difference in characteristics of a plurality of the devices, and the determination whether the NOx removing device is normal or deteriorated is withheld if the rich inversion parameter value GAIRLNCR is greater than or equal to GAIRLNCNG and GAIRLNCR is less than or equal to GAIRLNCOK. In this case, the withholding flag FGRAY67B is set to "1", and the SOx removal processing (the processing for regenerating the NOx removing device) is executed. Accordingly, for a NOx removing device whose NOx absorbing capacity has been reduced by sulfur poisoning, the NOx absorbing capacity can be reliably recovered.

According to the processing of FIG. 10, if the exhaust amount parameter GAIRLNC exceeds the OK determination threshold GAIRLNCOK (GAIRLNCR>GAIRLNCOK) before the time t13 shown in FIG. 6B (i.e., during the time period TDLY shown in FIG. 6B), it is indicated that the NOx removing device 15 has the required NOx storing capacity, and the NOx removing device 15 is determined to be normal. In contrast, if the exhaust amount parameter GAIRLNC does not reach the NG determination threshold GAIRLNCNG before the time t13 (GAIRLNCR<GAIRLNCNG), it is indicated that the NOx storing capacity is insufficient, and the NOx removing device 15 is determined to be deteriorated. Further, if the NOx removing device 15 is in a condition intermediate between the normal condition and the deteriorated condition (GAIRLNCNG≦GAIRLNCR≦GAIRLNCOK), it is decided to withhold the determination whether the NOx removing device 15 is normal or deteriorated.

Figure 11:
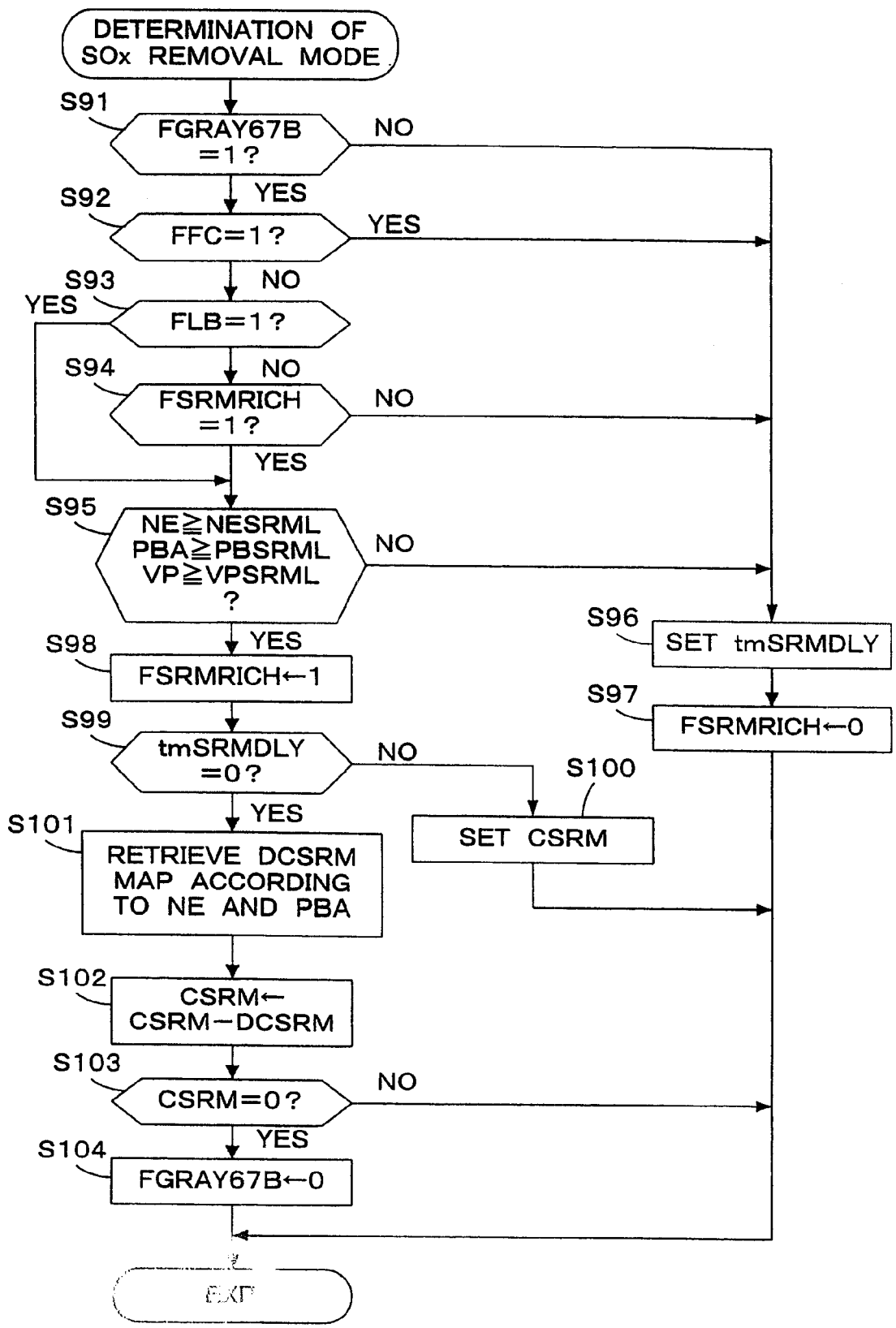
FIG. 11 is a flowchart showing a program for determining an execution mode of SOx removal processing.

FIG. 11 is a flowchart showing a program for determining an SOx removal mode, that is, a control mode for executing a processing for removing SOx absorbed by the NOx removing device 15. This program is executed by the CPU 5b in synchronism with the generation of a TDC signal pulse.

The SOx absorbed by the NOx absorbent in the NOx removing device 15 can be removed by enriching the air-fuel ratio in a condition where the temperature of the NOx absorbent is higher than about 600° C. Accordingly, the program of FIG. 11 determines a vehicle operating condition where the temperature of the NOx absorbent becomes high and controls the start and end of the SOx removal processing according to the vehicle operating condition.

In step S91, it is determined whether or not the withholding flag FGRAY67B is "1". If FGRAY67B is "1", indicating that the withholding of deterioration determination has been decided, it is then determined whether or not a fuel cut flag FFC is set to "1", indicating the duration of a fuel cut operation of the engine (step S92). If FFC is set to "0" (not equal to "1"), this indicates that the engine 1 is not in the fuel cut operation. Then it is determined whether or not the lean operation flag FLB is "1" (step S93). If FLB equals "0" indicating that the engine 1 is not in the lean operation, then it is determined whether or not the SOx removal flag FSRMRICH is "1" (step S94).

Figure 12:
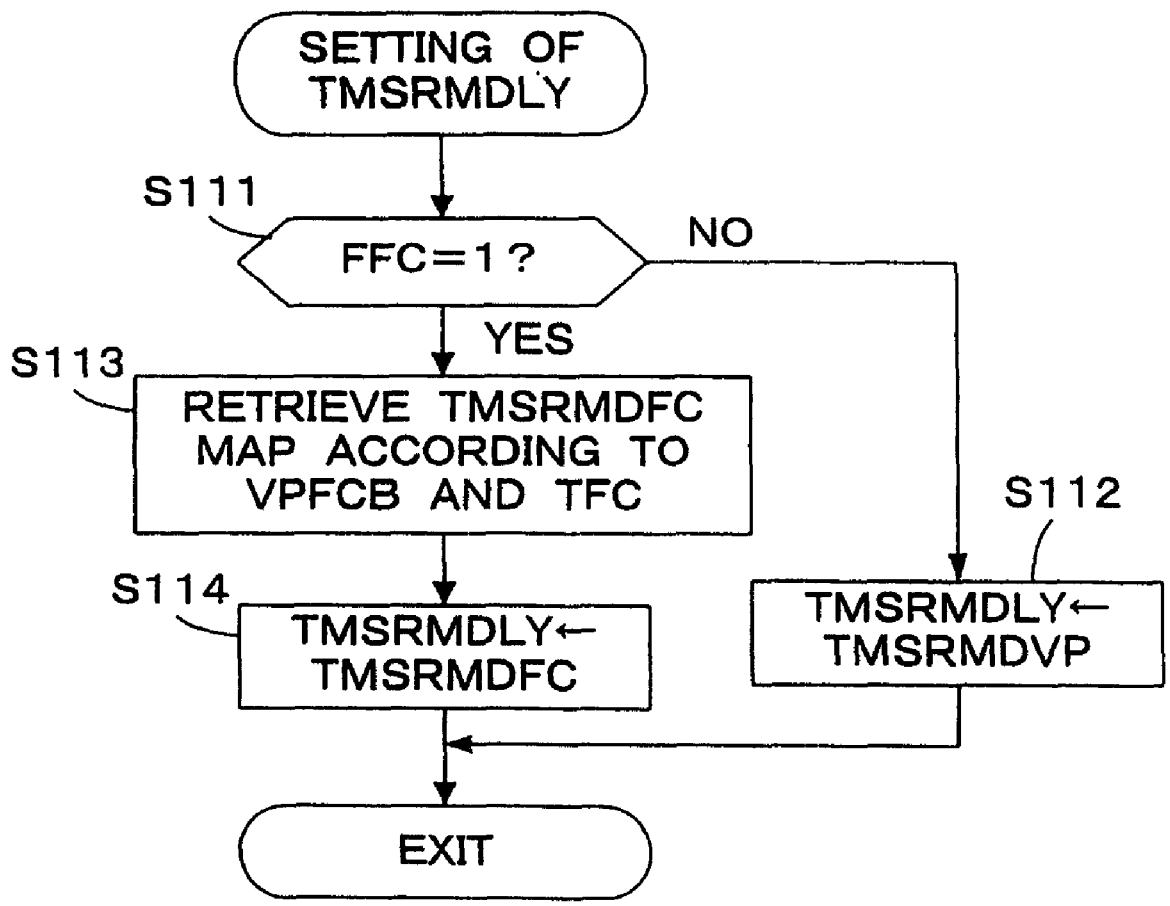
FIG. 12 is a flowchart showing a program for setting a delay time period (TMSRMDLY) used in the processing of FIG. 11.

If 1) FGRAY67B is "0", which indicates that the withholding of deterioration determination has not been decided, 2) FFC is "1", which indicates that the engine 1 is in the fuel cut operation, or 3) FLB is "0" and FSRMRICH is "0", which indicates that the engine 1 is not in the lean operation and the SOx removal processing is not in execution, a delay time TMSRMDLY set by the processing of FIG. 12 is set in a downcount timer tmSRMDLY to be referred in step S99 which will be described below and the timer tmSRMDLY is started (step S96). Then, the SOx removal flag FSRMRICH is set to "0" (step S97), and this program ends.

On the other hand, if the withholding flag FGRAY67B is set to "1", the engine 1 is not in the fuel cut operation, and the engine 1 is in the lean operation or the SOx removal processing has already been started, it is determined whether or not the engine rotational speed NE, the absolute intake pressure PBA, and the vehicle speed VP are in respective predetermined ranges (step S95). More specifically, it is determined whether or not the engine rotational speed NE is greater than or equal to a predetermined engine rotational speed NESRML (e.g., 2500 rpm), the absolute intake pressure PBA is greater than or equal to a predetermined pressure PBSRML (e.g., 75 kPa), and the vehicle speed VP is greater than or equal to a predetermined vehicle speed VPSRML (e.g., 100 km/h). If the answer to step S95 is negative (NO), the program proceeds to step S96, whereas if the answer to step S95 is affirmative (YES), the SOx removal flag FSRMRICH is set to "1" (step S98), and it is determined whether or not the current value of the timer tmSRMDLY started in step S96 is "0" (step S99). If tmSRMDLY is not "0", a predetermined value CSRMO is set in the downcounter CSRM (step S100), and this program ends.

Figure 13A:
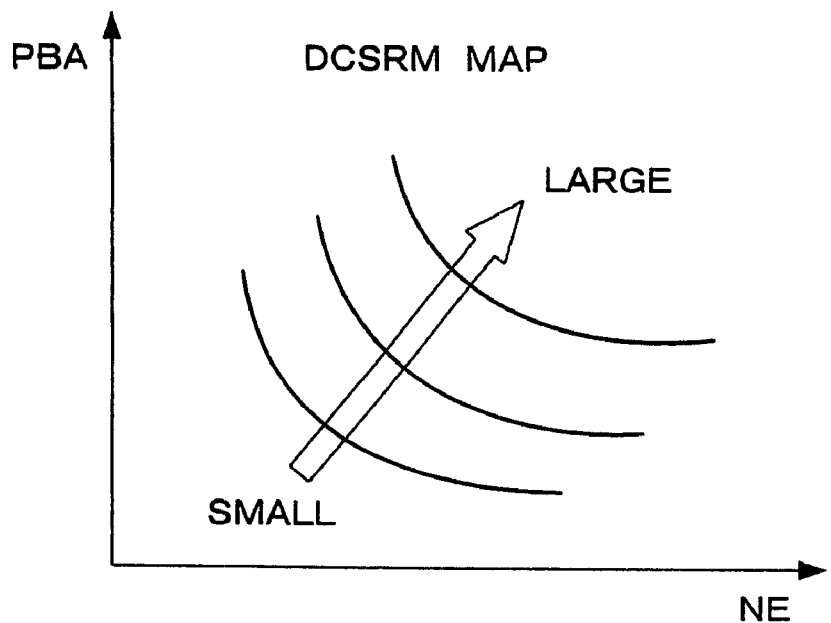
FIGS. 13A and 13B are graphs showing maps used in the processing of FIG. 11 or FIG. 12.

If tmSRMDLY is "0", the program proceeds from step S99 to step S101, in which a DCSRM map shown in FIG. 13A is retrieved according to the engine rotational speed NE and the absolute intake pressure PBA to calculate a subtraction value DCSRM of the downcounter CSRM. The subtraction value DCSRM is to be used in step S102. The DCSRM map is set so that the subtraction value DCSRM increases with an increase in the engine rotational speed NE and an increase in the absolute intake pressure PBA. The subtraction value DCSRM is set so as to be substantially proportional to an exhaust gas flow and be proportional to the amount of SOx removed from the NOx absorbent per unit time.

In step S102, the current value of the counter CSRM is decremented by the subtraction value DCSRM. Then, it is determined whether or not the current value of the counter CSRM has become "0" (step S103). If CSRM is greater than "0", this program ends. When CSRM equals "0", it is determined that the removal of SOx from the NOx absorbent has been completed, and the withholding flag FGRAY67B is returned to "0" (step S104). Then, this program ends. After the withholding flag FGRAY67B becomes "0", the program in the next cycle proceeds from step S91 to steps S96 and S97, and the SOx removal mode ends.

FIG. 12 is a flowchart showing a program for setting the delay time TMSRMDLY to be set in the timer tmSRMDLY in step S96. This program is executed by the CPU $5b$ in synchronism with the generation of a TDC signal pulse.

In step S111, it is determined whether or not the fuel cut flag FFC is "1". If FFC is "0", indicating that the fuel cut operation is not in execution, the delay time TMSRMDLY is set to a normal delay time TMSRMDVP (e.g., 5 seconds) (step S112), and this program ends.

Figure 13B:
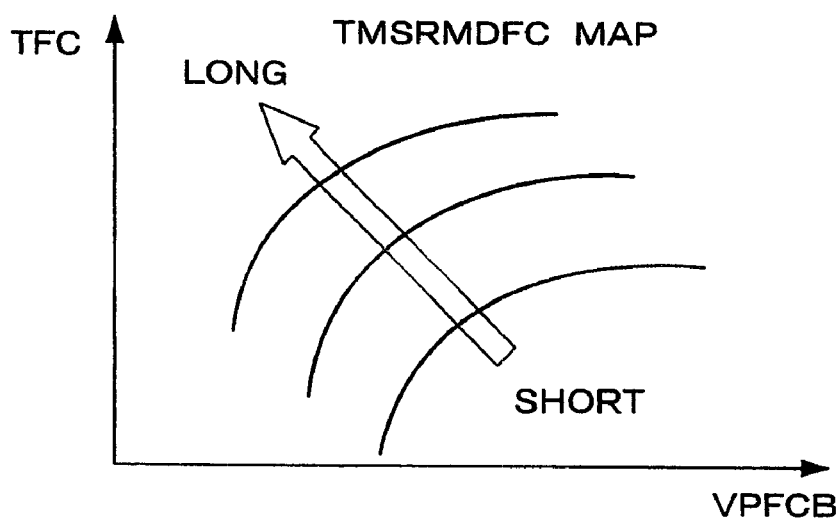

On the other hand, if FFC is "1", indicating that the fuel cut operation is in execution, a TMSRMDFC map shown in FIG. 13B is retrieved according to a vehicle speed VPFCB immediately before starting of the fuel cut operation and a duration time TFC of the fuel cut operation to calculate a delay time TMSRMDFC immediately after ending of the fuel cut operation, i.e., immediately after restarting of fuel supply (step S113). The TMSRMDFC map is set so that the delay time TMSRMDFC increases with a decrease in the vehicle speed VPFCB immediately before starting of the fuel cut operation and an increase in the duration time TFC of the fuel cut operation.

In step S114, the delay time TMSRMDLY is set to the delay time TMSRMDFC calculated in step S113, which is applied to the time immediately after restarting of fuel supply.

FIGS. 14A to 14H are time charts illustrating the control by the processing of FIG. 11. More specifically, FIG. 14A shows changes in the vehicle speed VP with time, FIG. 14B shows changes in the temperature TLNC of the NOx absorbent (catalyst) in the NOx removing device 15 (the temperature TLNC will be hereinafter referred to as "catalyst temperature") with time, FIG. 14C shows changes in the execution conditions flag FMCND67B with time, FIG. 14D shows changes in the withholding flag FGRAY67B with time, FIG. 14E shows changes in the SOx removal flag FSRMRICH with time, FIG. 14F shows changes in value of the downcount timer tmSRMDLY with time, FIG. 14G shows changes in value of the downcounter CSRM with time, and FIG. 14H shows changes in the target air-fuel ratio coefficient KCMD with time.

When the execution conditions of deterioration determination are satisfied at the time t21 and the execution conditions flag FMCND67B (FIG. 14C) is set to "1", the target air-fuel ratio coefficient KCMD is set to the predetermined enrichment value KCMDRM for deterioration determination, and the deterioration determination is executed. As a result, when a decision of withholding the determination is made at the time t22, the withholding flag FGRAY67B (FIG. 14D) is set to "1", and the predetermined value CSRMO is set in the downcounter CSRM. When the vehicle speed VP exceeds the predetermined vehicle speed VPSRML at the time t23, the engine rotational speed NE and the absolute intake pressure PBA also satisfy the conditions of step S95 in FIG. 11 and the SOx removal flag FSRM-RICH is then set to "1", so that the SOx removal mode is started. At this time, the downcount timer tmSRMDLY starts to downcount, and the target air-fuel ratio coefficient KCMD is set to the predetermined enrichment value KCMDSRM for SOx removal processing.

The value of the timer tmSRMDLY becomes "0" at the time t24. At this time, the catalyst temperature TLNC almost reaches a regenerable temperature TLNCA (e.g., about 600° C.), so that the removal of SOx from the NOx absorbent is started and the counter CSRM starts to downcount. When the value of the counter CSRM becomes "0" (at the time t25), the SOx removal mode ends.

According to this second preferred embodiment as described above, in the case that the NOx removing device can be determined to be apparently deteriorated in consideration of the difference in characteristics of the NOx removing device (GAIRLNCR<GAIRLNCNG), the deterioration of the NOx removing device is determined and an alarm is given to the driver. Further, in the case that the NOx removing device cannot be determined to be apparently deteriorated and cannot also be determined to be normal (GAIRLNCNG≦GAIRLNCR≦GAIRLNCOK), the determination of normality or deterioration is withheld and the SOx removal processing (the regeneration processing for the NOx removing device) is carried out. Accordingly, in the case that the NOx removing device is determined to be apparently deteriorated, the driver can take certain measures at once, whereas in the case that the absorbing capacity of the NOx absorbent is reduced by sulfur poisoning, the determination of normality or deterioration is withheld and the NOx absorbent can be reliably regenerated. As a result, good exhaust characteristics can be maintained over a long period of time.

In this preferred embodiment, the processing of FIG. 10 corresponds to the deterioration determining means, step S75a in FIG. 10 and the alarm lamp (not shown) or the like correspond to the alarming means, and steps S20 and S39 in FIG. 9 and the processing of FIG. 11 correspond to the deterioration regenerating means.

Figure 15:
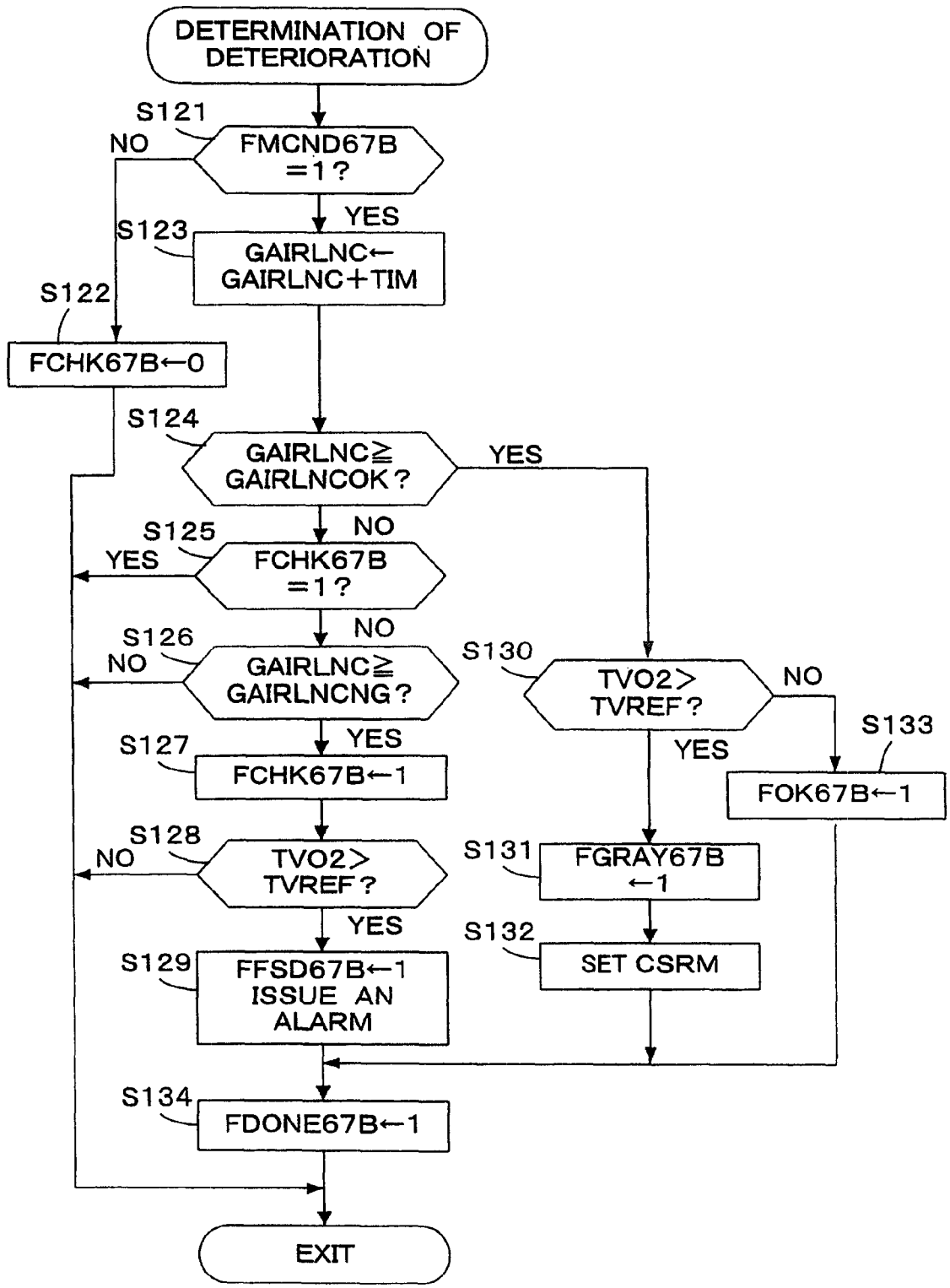
FIG. 15 is a flowchart showing a modification of the processing shown in FIG. 10.

The processing of FIG. 10 according to the second preferred embodiment may be replaced by the processing of FIG. 15.

In step S121 of FIG. 15, it is determined whether or not the execution conditions flag FMCND67B is "1". If FMCND67B is "0", indicating that the execution conditions are not satisfied, an NG determination end flag FCHK67B is set to "0", indicating the end of NG determination (step S122), and this program ends.

If FMCND67B is "1", the exhaust amount parameter GAIRLNC is calculated from Eq. (2) mentioned above (step S123), and it is determined whether or not the exhaust amount parameter GAIRLNC is greater than or equal to the OK determination threshold GAIRLNCOK (step S124). At first, GAIRLNC is less than GAIRLNCOK, so that it is determined whether or not the NG determination end flag FCHK67B is "1" (step S125). At first, FCHK67B is "0", so that it is determined whether or not the exhaust amount parameter GAIRLNC is greater than or equal to the NG determination threshold GAIRLNCNG (step S126). At first, GAIRLNC is less than GAIRLNCNG, so that this program ends.

If GAIRLNC is greater than or equal to GAIRLNCNG, the NG determination end flag FCHK67B is set to "1" (step S127), and it is determined whether or not the output voltage TVO2 from the downstream O2 sensor 19 is higher than the reference voltage TVREF at this time (step S128). If TVO2 is less than or equal to TVREF, this program ends, whereas if TVO2 is greater than TVREF, it is determined that the NOx removing device 15 is deteriorated, the deterioration flag FFSD67B is set to "1", and an alarm indicating the deterioration is given (step S129). Then, the end flag FDONE67B is set to "1" (step S134), and the program ends.

In the case that TVO2 is less than or equal to TVREF at the time the NG determination end flag FCHK67B is set to "1" in step S127, the mode of executing steps S121, S123, S124, and S125 and then ending the program continues. When the exhaust amount parameter GAIRLNC reaches the OK determination threshold GAIRLNCOK in this mode, it is then determined whether or not the output voltage TVO2 from the downstream O2 sensor 19 is higher than the reference voltage TVREF (step S130). If TVO2 is less than or equal to TVREF in step S130, the NOx removing device 15 is determined to be normal and the normality flag FOK67B is set to "1" (step S133). When TVO2 is greater than TVREF in step S130, the withholding flag FGRAY 67B is set to "1" (step S131) and the predetermined value CSRMO is set in the counter CSRM (step S132). Then, the program ends.

According to the processing of FIG. 15, if the output voltage TVO2 from the downstream O2 sensor 19 is higher than the reference voltage TVREF at the time the exhaust amount parameter GAIRLNC has reached the NG determination threshold GAIRLNCNG, the NOx removing device 15 is determined to be deteriorated. On the other hand, if the exhaust amount parameter GAIRLNC has reached the OK determination threshold GAIRLNCOK without determining that the NOx removing device 15 is deteriorated, and the output voltage TVO2 from the downstream O2 sensor 19 is less than or equal to the reference voltage TVREF at this time, the NOx removing device 15 is determined to be normal. If TVO2 is greater than TVREF at this time, the determination whether the NOx removing device 15 is normal or deteriorated is withheld. Thus, the determination of the normality, deterioration or the decision of withholding this determination can be performed similar to the processing of FIG. 11.

In this modification, the processing of FIG. 15 corresponds to the deterioration determining means, and step S129 in FIG. 15 corresponds to the alarming means.

In the above preferred embodiment, when the withholding flag FGRAY67B is set to "1", the SOx removal processing is executed when the NOx removing device 15 is in a condition allowing the SOx removal processing (TLNC>TLNCA) after changes in vehicle operating condition. The present invention is not limited to this processing. For example, when FGRAY67B is "1", the control of accelerating a rise in temperature of the NOx removing device (e.g., short-period air-fuel ratio switching control for switching the air-fuel ratio between a rich air-fuel ratio and a lean air-fuel ratio with a period of about 1 second) may be executed to thereby rapidly raise the temperature of the NOx removing device (NOx absorbent) (TLNC>TLNCA), thus executing the SOx removal processing.

Further, while the proportional type air-fuel ratio sensor (oxygen concentration sensor) 17 is provided upstream of the three-way catalyst 14, and the binary type oxygen concentration sensors 18 and 19 are provided upstream and downstream of the NOx removing device 15, respectively, in the above preferred embodiment, the type and arrangement of each oxygen concentration sensor is not limited to the above. For example, all of the oxygen concentration sensors may be of either the proportional type or the binary type.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An exhaust emission control system for an exhaust system for an internal combustion engine, having a nitrogen oxide removing means for absorbing nitrogen oxides contained in exhaust gases in an exhaust lean condition; said control system comprising:

first and second oxygen concentration sensors respectively provided upstream and downstream of said nitrogen oxide removing means, said oxygen concentration sensors detecting the oxygen concentration in the exhaust gases;

deterioration-determination enriching means for changing the air-fuel ratio of the air-fuel mixture to be supplied to said engine from a lean region to a rich region with respect to a stoichiometric ratio;

reducing component amount calculating means for calculating an amount of reducing components flowing into said nitrogen oxide removing means from the time when the output value from said first oxygen concentration sensor has changed to a value indicative of a rich air-fuel ratio after the enrichment executed by said deterioration-determination enriching means has started;

deterioration determining means for determining deterioration of said nitrogen oxide removing means according to the amount of reducing components calculated by said reducing-component amount calculating means and the output value from said second oxygen concentration sensor; and reduction enriching means for intermittently enriching the air-fuel ratio to reduce nitrogen oxides absorbed by said nitrogen oxide removing means, wherein said deterioration-determination enriching means executes enrichment of the air-fuel ratio with a degree of enrichment smaller than a degree of enrichment executed by said reduction enriching means over a time period longer than a time period of enrichment executed by said reduction enriching means.

2. An exhaust emission control system according to claim 1, wherein said deterioration determining means determines that said nitrogen oxide removing means is deteriorated when the output value from said second oxygen concentration sensor indicates a rich air-fuel ratio at the time the amount of reducing components calculated by said reducing-component amount calculating means has reached a predetermined amount.

3. An exhaust emission control system according to claim 1, wherein said reducing-component amount calculating means calculates the amount of reducing components by integrating an amount of exhaust gases flowing into said nitrogen oxide removing means.

4. An exhaust emission control system according to claim 3, wherein said reducing-component amount calculating means uses a basic fuel amount as a parameter indicative of the amount of exhaust gases flowing into said nitrogen oxide removing means, said basic fuel amount being set according to a rotational speed of said engine and an intake air pressure of said engine so that the air-fuel ratio becomes a substantially constant value.

5. An exhaust emission control system according to claim 1, wherein said first and second oxygen concentration sensors have characteristics that the output values therefrom rapidly change in the vicinity of the stoichiometric ratio.

* * * * *